US012606373B2

(12) United States Patent
Schauer et al.

(10) Patent No.: US 12,606,373 B2
(45) Date of Patent: Apr. 21, 2026

(54) RACK STORAGE SYSTEM WITH IMPROVED TRANSPORT VEHICLE LIFTING DEVICE

(71) Applicant: TGW Logistics GmbH, Marchtrenk (AT)

(72) Inventors: Johannes Schauer, Sankt Marienkirchen an der Polsenz (AT); Stefan Glueck, Offenhausen (AT); Thomas Wimmer, Niederthalheim (AT)

(73) Assignee: TGW Logistics GmbH, Marchtrenk (AT)

( * ) Notice: Subject to any disclaimer, the term of this patent is extended or adjusted under 35 U.S.C. 154(b) by 932 days.

(21) Appl. No.: 17/779,233

(22) PCT Filed: Dec. 4, 2020

(86) PCT No.: PCT/AT2020/060434
§ 371 (c)(1),
(2) Date: May 24, 2022

(87) PCT Pub. No.: WO2021/108827
PCT Pub. Date: Jun. 10, 2021

(65) Prior Publication Data
US 2022/0402699 A1 Dec. 22, 2022

(30) Foreign Application Priority Data
Dec. 6, 2019 (AT) .............................. A 51067/2019

(51) Int. Cl.
B65G 1/137 (2006.01)
B65G 1/04 (2006.01)
(Continued)

(52) U.S. Cl.
CPC ......... B65G 1/1373 (2013.01); B65G 1/0435 (2013.01); B65G 1/0492 (2013.01); B65G 1/065 (2013.01); B66F 9/0755 (2013.01)

(58) Field of Classification Search
CPC .. B65G 1/1373; B65G 1/0492; B65G 1/0435; B65G 1/065; B66F 9/0755
See application file for complete search history.

(56) References Cited

U.S. PATENT DOCUMENTS 3,130,819 A * 4/1964 Marshall ................. F16F 7/121
29/455.1
10,710,802 B2 7/2020 Grosse et al.
(Continued)

FOREIGN PATENT DOCUMENTS

CN 1976826 A 6/2007
CN 105151617 A 12/2015
(Continued)

OTHER PUBLICATIONS

WO-2012106744-A1 (Year: 2012).*
(Continued)

*Primary Examiner* — Ernesto A Suarez
*Assistant Examiner* — Laurence R Brothers
(74) *Attorney, Agent, or Firm* — Collard & Roe, P.C.

(57) ABSTRACT

A rack storage system includes first and second storage racks, a rack aisle therebetween, rack guide tracks arranged in pairs in driving planes above each other, a transport vehicle displaceable in the rack aisle, a transport vehicle lifting device with a vertically extending guide frame and a lift frame mounted thereon so as to be adjustable by a lift drive. A receiving device including lift guide tracks positionable relative to the rack guide tracks and by which the vehicle is transportable between the planes is arranged on the lift frame. Vertical first and second guide profiles are (Continued)

connected to the rack guide tracks. First and second lift guide tracks are mounted on the lift frame to be movable parallel to the rack guide tracks by guide devices. First and second coupling devices respectively couple the first and second lift guide tracks to the first and second guide profiles, respectively.

27 Claims, 16 Drawing Sheets

(51) Int. Cl.
    *B65G 1/06*           (2006.01)
    *B66F 9/075*         (2006.01)

(56)           References Cited

U.S. PATENT DOCUMENTS

| | | | |
|---|---|---|---|
| 2004/0228709 A1 * | 11/2004 | Ueda | B65G 1/0421 |
| | | | 414/279 |
| 2008/0015756 A1 | 1/2008 | Schmidt | |
| 2008/0247848 A1 | 10/2008 | Freudelsperger | |
| 2019/0291955 A1 | 9/2019 | Bastian, II | |
| 2020/0339349 A1 | 10/2020 | Frissenbichler | |

FOREIGN PATENT DOCUMENTS

| | | | |
|---|---|---|---|
| CN | 108367862 A | | 8/2018 |
| CN | 108820663 A | * | 11/2018 |
| DE | 2113202 A1 | * | 10/1972 |
| DE | 3943428 C1 | * | 1/1991 |
| DE | 10 2009 032 406 A1 | | 1/2011 |
| DE | 10 2013 114 275 A1 | | 6/2014 |
| DE | 10 2017 219 431 A1 | | 5/2019 |
| EP | 1 716 060 B1 | | 7/2007 |
| EP | 2 673 218 B1 | | 12/2016 |
| EP | 2 673 220 B1 | | 4/2017 |
| EP | 3205607 A1 | | 8/2017 |
| EP | 2 673 219 B1 | | 3/2018 |
| EP | 3205607 B1 | | 10/2021 |
| FR | 2 710 330 A1 | | 3/1995 |
| JP | S56-162207 U | | 12/1981 |
| JP | 2016-060622 A | | 4/2016 |
| JP | 2016-155659 A | | 9/2016 |
| JP | 2019-182642 A | | 10/2019 |
| RU | 2574299 C1 | * | 2/2016 ............ B66C 19/00 |
| WO | 2012/106745 A1 | | 8/2012 |
| WO | 2012/106746 A1 | | 8/2012 |
| WO | 2012/106747 A1 | | 8/2012 |
| WO | WO-2012106744 A1 | * | 8/2012 .......... B65G 1/0414 |

OTHER PUBLICATIONS

DE-3943428-C1 (Year: 1991).*
CN-108820663-A (Year: 2018).*
RU-2574299-C1 (Year: 2016).*
International Search Report of PCT/AT2020/060434, mailed Mar. 22, 2021.

* cited by examiner

6

59

81b    81a

70

61

131    60

70

X1    X2

89

Y
Z    X

6'

59

81b

81a

70

61

60

70

89

Y

Z — X

RACK STORAGE SYSTEM WITH IMPROVED TRANSPORT VEHICLE LIFTING DEVICE

CROSS REFERENCE TO RELATED APPLICATIONS

This application is the National Stage of PCT/AT2020/060434 filed on Dec. 4, 2020, which claims priority under 35 U.S.C. § 119 of Austrian Application No. A 51067/2019 filed on Dec. 6, 2019, the disclosure of which is incorporated by reference. The international application under PCT article 21(2) was not published in English.

BACKGROUND OF THE INVENTION

1. Field of the Invention

The invention relates to a rack storage system for unit loads as disclosed herein.

2. Description of the Related Art

EP 2 673 220 A1 and EP 2 673 218 A1 disclose a rack storage system comprising
  a first storage rack with storage places for unit loads, wherein storage places are arranged next to one another in storage planes located on top of each other,
  a second storage rack with storage places for unit loads, wherein storage places are arranged next to one another in storage planes located on top of each other,
  a rack aisle between the first storage rack and the second storage rack,
  rack guide tracks attached to the first storage rack and second storage rack and arranged in each case in pairs in driving planes located on top of each other,
  at least one automated transport vehicle movable in the rack aisle along the rack guide tracks in order to store the unit loads in the storage places and to retrieve the unit loads from the storage places,
  a transport vehicle lifting device with a vertically extending guide frame and a receiving device mounted on the guide frame so as to be adjustable by a lift drive, wherein the receiving device comprises lift guide tracks extending in parallel with the rack guide tracks and positionable relative to the rack guide tracks, and transports the transport vehicle between the driving planes.

FR 2 710 330 A1, DE 2 113 202 A1, EP 1 716 060 B1 and DE 10 2009 032 406 A1 disclose rack storage systems in which a transport vehicle lifting device for transporting the transport vehicle between the driving planes is provided. While, according to EP 2 673 220 A1, EP 2 673 218 A1, FR 2 710 330 A1, DE 2 113 202 A1 and EP 1 716 060 B1, the transport vehicle lifting device is arranged stationarily in front of the rack aisle, the embodiment according to DE 10 2009 032 406 A1 has the transport vehicle lifting device be displaceable along a rack storage side and a transport vehicle be relocatable between rack aisles.

Such transport vehicle lifting devices are primarily used if for each rack aisle fewer transport vehicles than driving planes are present.

In these known rack storage systems, the mounting work must be carried out with adherence to very narrow tolerance standards. This takes effort and is costly. If wider tolerances are permitted, the gap distance between the rack guide tracks on the storage racks and the lift guide tracks on the transport vehicle lifting device may vary strongly across the entire adjustment region of the liftable and lowerable receiving device, and/or a height offset between a second rack guide track of the rack guide tracks on the storage racks and a second lift guide track of the lift guide tracks on the transport vehicle lifting device in a driving plane can barely be avoided if the liftable and lowerable receiving device with the first lift guide track of the lift guide tracks is positioned with respect to the first rack guide track of the rack guide tracks. This may lead to significant faults during operation.

SUMMARY OF THE INVENTION

An object of the invention is to provide an improved rack storage system. In particular, a reliable transfer of a transport vehicle from rack guide tracks to lift guide tracks of a receiving device of the transport vehicle lifting device and vice versa is to be made possible. In particular, transfer times are to be optimized, as well.

The object of the invention is achieved in that a first guide profile is provided, which extends essentially in parallel with the guide frame and is connected to the rack guide tracks on the first storage rack, and a second guide profile is provided, which extends essentially in parallel with the guide frame and is connected to the rack guide tracks on the second storage rack, and a first lift guide track of the lift guide tracks is mounted on the lift frame so as to be movable by a first guide device in a direction parallel to the (stationary) rack guide tracks (thus in the direction of the rack aisle) and is coupled via a first coupling device to the first guide profile, and a second lift guide track of the lift guide tracks is mounted on the lift frame so as to be movable by a second guide device in a direction parallel to the (stationary) rack guide tracks (thus in the direction of the rack aisle) and is coupled via a second coupling device to the second guide profile.

The first guide profile is connected to the rack guide tracks on the first storage rack, and the second guide profile is connected to the rack guide tracks on the second storage rack.

Due to the coupling between the first lift guide track and the (vertical) first guide profile, the first lift guide track (mounted in a "floating" manner) can follow the longitudinal extension of the first guide profile. Due to the coupling between the second lift guide track and the (vertical) second guide profile, the second lift guide track (mounted in a "floating" manner) can follow the longitudinal extension of the second guide profile.

The mounting of the first rack guide tracks and second rack guide tracks is significantly less elaborate than is known from the prior art. This is true mainly because the requirement for an exactly aligned position of the end edges of the first rack guide tracks arranged on top of each other in the driving planes and an exactly aligned position of the end edges of the second rack guide tracks arranged on top of each other in the driving planes can be reduced.

By these measures, the gap distance between end edges of the rack guide tracks facing one another and the lift guide tracks can be kept essentially constant across the entire adjustment region of the liftable and lowerable receiving device. Manufacturing tolerances and/or mounting-related discrepancies have no adverse effects on the gap distance. Even if due to temperature fluctuations, changes in length occur on the rack guide tracks, which are relatively long with respect to the lift guide tracks, the first guide profile and the second guide profile may "move along" and the longitudinal extension of the first guide profile and the longitudinal extension of the second guide profile also adapt. Even in this unfavorable situation, the gap distance remains essentially unchanged as the first/second lift guide track follow the changed longitudinal extension of the first/second guide profile due to the coupling between the first lift guide track and the (vertical) first guide profile and/or due to the coupling between the second lift guide track and the (vertical) second guide profile.

This has a particularly favorable effect on the performance of the rack storage system. The transport vehicle may drive over the distance gap at a high speed without having to accept an increased wear of the running wheels because of it.

Preferably, the first lift guide track and the second lift guide track are mounted on the lift frame so as to be movable, independently of each other, in a direction parallel to the rack guide tracks (thus in the direction of the rack aisle).

By this measure, the gap distance between end edges of the first rack guide tracks facing one another and the first lift guide track can be kept essentially constant across the entire adjustment region of the liftable and lowerable receiving device, and the gap distance between end edges of the second rack guide tracks facing one another and the second lift guide track can be kept essentially constant.

This proves particularly advantageous as the requirement of an exact aligned position of the end edges of the first rack guide track and second rack guide track, arranged next to each other in each driving plane, can be reduced.

Even though this is not shown in further detail, the transport vehicle lifting device may comprise a first receiving device and a second receiving device, wherein the first receiving device is mounted on the guide frame by a first lift frame, and wherein the second receiving device is mounted on the guide frame by a second lift frame. The first lift frame is adjustable by a first lift drive, and the second lift frame is adjustable by a second lift drive. A control unit controls the first lift drive and second lift drive such that the first lift frame and second lift frame do not collide. The first receiving device and second receiving device are preferably designed as described above, each comprising the first lift guide track and second lift guide track, which are coupled to the first guide profile and the second guide profile by the first/second coupling devices.

According to an advancement of the invention, the first coupling device comprises a holder and guide wheels mounted thereon so as to be rotatable about horizontal axes, wherein the guide wheels rest in a rollable manner on the first guide profile on guideways facing away from one another, and the second coupling device comprises a holder and guide wheels mounted thereon so as to be rotatable about horizontal axes, wherein the guide wheels rest in a rollable manner on the second guide profile on guideways facing away from one another.

The first guide profile comprises a guide section, wherein the guideways facing away from one another are formed on the guide section. The guide section preferably extends in a vertical guide plane oriented perpendicularly to the rack aisle.

The second guide profile comprises a guide section, wherein the guideways facing away from one another are formed on the guide section. The guide section preferably extends in a vertical guide plane oriented perpendicularly to the rack aisle.

This allows the first coupling device and second coupling device to be easily constructed to operate reliably over a long period of use without external energy.

According to an advantageous design, the guide frame comprises a guide assembly and the lift drive comprises a lifting motor and a traction drive, wherein the lift frame is coupled to the traction drive and is mounted on the guide assembly by guide rollers.

Such an arrangement is characterized by a reliable operation.

It may also prove advantageous if the guide frame has an open profile cross-section, wherein the profile cross-section comprises a profile base, profile limbs projecting from the profile base, and mounting limbs angled on the free ends of the profile limbs, wherein the guide frame is fastened to the first storage rack or second storage rack by the mounting limbs.

The profile cross-section may, in particular, be C-shaped (with mounting limbs bent inwards) or U-shaped with mounting limbs pointing outwards, in particular bent outwards. Due to the open design, the extensions on the guide frame are easily accessible, whereby not only the production of the transport vehicle lifting device but also its maintenance is made easier.

Moreover, it is advantageous that the material usage is low and also the weight is reduced to a minimum. This makes easier mounting with little technical effort possible, and the transport costs are low, as well.

It also proves favorable if the first rack guide track forms a mounting section in an end adjacent to the transport vehicle lifting device, wherein the mounting section is provided with a prefabricated passage opening arranged at a clearance from the end edge of the first rack guide track, the first guide profile forms a row of prefabricated passage openings.

the first rack guide track and the first guide profile are connected to one another by at least one connecting means, in particular a screw, which penetrates the passage openings.

the second rack guide track forms a mounting section in an end adjacent to the transport vehicle lifting device, wherein the mounting section is provided with a prefabricated passage opening arranged at a clearance from the end edge of the second rack guide track, the second guide profile forms a row of prefabricated passage openings, and the second rack guide track and the second guide profile are connected to one another by at least one connecting means, in particular a screw, which penetrates the passage openings.

The passage opening at the first rack guide track is arranged within predetermined (narrow) tolerances at a clearance from the end edge of the first rack guide track. Preferably, the passage opening is an elongated hole, the longitudinal axis of the elongated hole extends in parallel with the longitudinal direction of the first guide profile. This way, during mounting, the first guide profile can be positioned in the vertical direction relative to the first rack guide tracks and subsequently be connected to the first rack guide tracks.

The passage opening at the second rack guide track is arranged within predetermined (narrow) tolerances at a clearance from the end edge of the second rack guide track. Preferably, the passage opening is an elongated hole, the longitudinal axis of the elongated hole extends in parallel with the longitudinal direction of the second guide profile. This way, during mounting, the second guide profile can be positioned in the vertical direction relative to the second rack guide tracks and subsequently be connected to the second rack guide tracks.

The first guide profile comprises a row of passage openings. Likewise, the second guide profile comprises a row of passage openings. The passage openings of the row may be provided at any desired grid distance, which increases the flexibility of selecting mounting positions. In particular, the passage openings of one row are provided on a baseline and at constant distances. If a high variability of mounting positions is to be provided, only the grid distance must be selected to be smaller. These passage openings are, for example, circular-cylindrical holes.

The mentioned passage openings are preferably prefabricated. Thus, a connection between the first rack guide tracks/the first guide profile and the second rack guide tracks/the second guide profile can be established at the construction site without great installation effort. Only a passage opening of the first rack guide tracks and at least one passage opening of the row of the first guide profile/a passage opening of the second rack guide tracks and at least one passage opening of the row of the second guide profile are to be aligned relative to one another such that the mentioned passage openings can be penetrated by a connecting means, in particular a screw.

The first rack guide tracks/second rack guide tracks and the first guide profile/second guide profile can be prefabricated in the factory, post-processing at the construction site can be omitted.

According to an advantageous embodiment, it may also be provided that the lift drive comprises a lifting motor cooperating with a first positioning system in order to position the lift guide tracks with respect to the rack guide tracks on a driving plane, one of the lift guide tracks is mounted on the lift frame so as to be adjustable in a direction perpendicular to the driving plane by an adjusting device, and the adjusting device comprises an actuating motor cooperating with a second positioning system in order to position the mentioned lift guide track with respect to one of the rack guide tracks of one of the driving planes.

Generally, the height positioning of the receiving device with respect to the first rack guide track and second rack guide track is carried out by the lift drive. However, the positioning may still be insufficiently precise, for example if a change in height of the rack guide tracks is to be expected during operation due to placing the storage racks. In this case, it is advantageous if additionally, a "fine positioning system" is provided and one of the lift guide tracks can be aligned relative to one of the first and second rack guide tracks at the height of a driving plane.

In particular, it proves advantageous if the receiving device is positioned with respect to the first rack guide track and second rack guide track by the lift drive, such that the first lift guide track is aligned relative to one of the first rack guide tracks. Subsequently, the second lift guide track is positioned by the adjusting device, independently of the first lift guide track, such that the second lift guide track is aligned relative to one of the second rack guide tracks.

If the first lift guide track is aligned with respect to the first rack guide track and the second lift guide track is aligned with respect to the second rack guide track, the transport vehicle operated in an automated manner can be moved onto the receiving device on this driving plane, or the transport vehicle operated in an automated manner can be moved from the receiving device into the rack aisle on this driving plane.

In particular, it proves advantageous if the first lift guide track is aligned higher than the first rack guide track by a compensation dimension by the lift drive, and the second lift guide track is aligned higher than the second rack guide track by a compensation dimension by the adjusting device. In this regard, the compensation dimension takes into account a weight force of the unloaded transport vehicle or loaded transport vehicle. A controller is configured to calculate the compensation dimension and/or a height compensation factor based on the weight force, wherein the controller controls the lift drive and adjusting device accordingly. As soon as the transport vehicle drives onto the lift guide tracks, the first rack guide track and the first lift guide track as well as the second rack guide track and the second lift guide track are positioned exactly relative to one another in a vertical direction in the corresponding driving plane. The transport vehicle driving over onto the receiving device may take place in a highly dynamic and particularly gentle manner.

It may prove advantageous if the transport vehicle lifting device comprises an energy-absorbing deformation device, which is stationarily arranged below the lift frame and/or the receiving device.

This way, damages to the transport vehicle lifting device are kept to a minimum if the traction drive were to fail (for example because a traction means of the traction drive rips) and the lift frame is not assigned a safety brake or a safety brake for the lift frame were to not react quickly enough. If the lift frame is situated below the height corresponding to the delay time or application time of the safety brake when the traction drive fails, the safety brake is completely ineffective. In the case of the lift frame moving downwards at its maximum speed at the time of the traction means ripping, the problem manifests even more strongly. However, with the aid of the deformation device, the crash of the lift frame can still be dampened. Advantageously, a deformation device usually has a lower constructional height than, for example, hydraulic dampers. During normal operation, the lift frame can thus be moved further downwards than would be the case, for example when using hydraulic dampers.

It also proves advantageous if the energy-absorbing deformation device comprises a force distribution plate with an impact surface for the receiving device, a honeycomb body that is plastically deformable by application of force, below the force distribution plate, wherein the honeycomb body at least partially absorbs the impact energy occurring upon collision of the lift frame and/or the receiving device with the force distribution plate, and a mounting plate below the honeycomb body for mounting the deformation device.

The lift frame only has a small surface in the vertical projection, or rather the contact surface between the lift frame and the deformation device is only small. Due to the force distribution plate, the forces occurring upon impact of the lift frame are still introduced evenly into the honeycomb body, and the honeycomb body is deformed evenly. It would generally also be possible to arrange a force distribution plate on the lift frame. However, in order to keep the moved mass of the receiving device and/or of the lift frame minimal, it is advantageous to mount the force distribution plate in a fixed manner on the honeycomb body. Preferably, the force distribution plate is connected, in particular glued, to the honeycomb body. Preferably, the mounting plate is also connected, in particular glued, to the honeycomb body.

According to an embodiment, cavities of the honeycomb body extend in the vertical direction.

The honeycomb structure results in a favorable stiffness-to-volume ratio and/or a favorable stiffness-to-weight ratio. This means that despite a high degree of energy absorption, the deformation body is small and/or lightweight upon deformation. Due to this, a deformation body with only a low constructional height can be provided, which facilitates movement of the lift frame up to just above floor height. Generally, about 75% of the constructional height of the honeycomb body can be utilized for dampening the impact. Additionally, the compression behavior of the deformation body may also be influenced well by the honeycomb structure. Finally, this also results in cheap production and replacement costs.

It may also prove favorable if a stop device is provided on the rack aisle end adjacent to the transport vehicle lifting device and in each driving plane, wherein the stop device comprises end stop buffers each movable between a stop position moved into the travel path of the transport vehicle and a release position moved out of the travel path of the transport vehicle.

In each driving plane, stop device are provided at the rack aisle end. While a first stop device with stationary end stop buffers is arranged on the rack aisle end facing away from the transport vehicle lifting device, a second stop device with end stop buffers which are movable between the stop position and the release position is provided on the rack aisle end facing the transport vehicle lifting device. If the transport vehicle of a driving plane is to be taken over on the receiving device of the transport vehicle lifting device or to be transferred from the receiving device to the rack aisle, the end stop buffers are moved out of the stop position into the release position. In the release position, the transport vehicle may drive past the second stop device. If the transport vehicle is fully on the receiving device or fully within the rack aisle, the end stop buffers may again be moved into the stop position, in which the transport vehicle can be blocked. Generally, it should be noted that the stop devices are only effective in case of a failure, for example if the transport vehicle does not properly decelerate and may drive against one of the stop devices.

According to an advantageous embodiment, each end stop buffer is arranged on a pivotable flap, wherein a pivot axis of the pivotable flap extends in parallel with the rack aisle. The stop device is stationary, however, the end stop buffer is arranged on a pivotable flap. Thereby, a space-saving arrangement, which works reliably, is achieved.

It may also prove to be an advantage if the lift frame and/or the receiving device is provided with an actuation device on a side adjacent to the rack aisle, wherein the actuation device comprises a first actuating element and a second actuating element, wherein the first actuating element is assigned to a first end stop buffer of the end stop buffers and the first end stop buffer is movable out of the stop position into the release position by the first actuation element, and wherein the second actuating element is assigned to a second end stop buffer of the end stop buffers and the second end stop buffer is movable out of the stop position into the release position by the second actuation element.

The actuation device is arranged on the transport vehicle lifting device, so that the end stop buffers of the actuation device are actuated remotely. It suffices if one drive motor actuates the first actuating element and one drive motor actuates the second actuating element. However, it is not required that drive motors are assigned to the first end stop buffer and second end stop buffer of each driving plane. The structure and control of the first/second end stop buffers is very simple.

It may also prove advantageous if the first actuating element has a first pivot lever, wherein a pivot axis of the first pivot lever extends in parallel with the rack aisle, and the second actuating element has a second pivot lever, wherein a pivot axis of the second pivot lever extends in parallel with the rack aisle.

The pivoting motion allows short positioning times and a reliable switching function.

According to a preferred embodiment, the first actuating element is coupled with a first drive motor, and the second actuating element is coupled with a second drive motor.

Due to this, the first actuating element and second actuating element can be switched independently of one another. This is particularly advantageous if one of the lift guide tracks is mounted on the lift frame so as to be adjustable by an adjusting device in a direction perpendicular to the driving plane, as described herein.

According to a design of the invention, it may be provided that the first actuating element is mounted on the first lift guide track and/or the second actuating element is mounted on the second lift guide track.

This is particularly advantageous if one of the lift guide tracks is mounted on the lift frame so as to be adjustable by an adjusting device in a direction perpendicular to the driving plane, as described herein. That is because if the mentioned lift guide track is adjusted perpendicularly to the driving plane, the actuating element, which is mounted on the lift guide track, is also moved along. This enables an optimal switching function even after an adjustment operation in a direction perpendicular to the driving plane.

According to an embodiment of the invention, it may be provided that the lift frame/the receiving device is provided with a first end stop buffer and second end stop buffer on a side facing away from the rack aisle, wherein the first end stop buffer is assigned to the first lift guide track and is movable between a stop position moved into the travel path of the transport vehicle and a release position moved out of the travel path of the transport vehicle, and wherein the second end stop buffer is assigned to the second lift guide track and is movable between a stop position moved into the travel path of the transport vehicle and a release position moved out of the travel path of the transport vehicle.

The transport vehicle may drive against the first end stop buffer and second end stop buffer if the transport vehicle is moved onto the receiving device. Usually, however, the transport vehicle is stopped even before reaching the first end stop buffer and second end stop buffer. However, it may absolutely happen that the transport vehicle drives against the first end stop buffer and second end stop buffer if it is not slowed down in time due to mass inertia.

On the other hand, the first end stop buffer and second end stop buffer are also to be movable out of the travel path of the transport vehicle, in order to be able to move the transport vehicle from the receiving device onto an (additional) buffering system. Different embodiments of such a buffering system are described for example in EP 2 673 219 B1.

In this regard, the receiving device is adjusted to a transfer plane, in which the transport vehicle is moved from the receiving device onto the buffering system or vice versa. Prior to this, the first end stop buffer and second end stop buffer is moved out of the stop position into the release position, preferably manually by an operator. If the first end stop buffer and second end stop buffer is in its release position, the transport vehicle can be moved between the release position and the buffering system either in an automated manner or manually.

It proves advantageous if the first end stop buffer is mounted on the first lift guide track and/or the second end stop buffer is mounted on the second lift guide track.

This is particularly advantageous if one of the lift guide tracks is mounted on the lift frame so as to be adjustable by an actuator in a direction perpendicular to the driving plane, as described herein. That is because if the mentioned lift guide track is adjusted perpendicularly to the driving plane, the end stop buffer, which is mounted on the lift guide track, is also moved along.

A particularly simple design occurs if the first end stop buffer has a first pivot lever, wherein a pivot axis of the first pivot lever extends in parallel with the rack aisle, and the second end stop buffer has a second pivot lever, wherein a pivot axis of the second pivot lever extends in parallel with the rack aisle.

The pivoting motion allows short positioning times and a reliable switching function.

It also proves favorable if the first lift guide track has a running surface and a positioning opening arranged in the running surface in a recessed manner, wherein the positioning opening is arranged in an end region facing away from the rack aisle and one of the running wheels arranged on a first vehicle side of the transport vehicle has a circumferential portion situated in the positioning opening when the transport vehicle is positioned on the receiving device.

Due to the positioning opening, a "locking" of one of the running wheels is possible, and during the adjustment movement of the lift frame, the transport vehicle can be retained in its relative position. The "locking" can take place without additional mechanical effort. If the transport vehicle is moved onto the receiving device, the running wheels roll on the lift guide tracks and one of the running wheels is positioned in the positioning opening if the transport vehicle is located on the receiving device. The transport vehicle can be positioned in the x-direction on a first vehicle side with respect to the receiving device, with one running wheel of the running wheels.

Generally, it would also be conceivable that the first lift guide track has a running surface and a first positioning opening arranged in the running surface in a recessed manner, wherein the first positioning opening is arranged in an end region facing away from the rack aisle and one of the running wheels arranged on a first vehicle side of the transport vehicle has a circumferential portion situated in the positioning opening when the transport vehicle is positioned on the receiving device, and a second positioning opening arranged in the running surface in a recessed manner, wherein the second positioning opening is arranged in an end region adjacent to the rack aisle and one of the running wheels arranged on a first vehicle side of the transport vehicle has a circumferential portion situated in the positioning opening when the transport vehicle is positioned on the receiving device.

It is also advantageous if the second lift guide track has a running surface and slide linings arranged on the running surface at a mutual distance from each other as the running wheels arranged on a second vehicle side of the transport vehicle, wherein the running wheels arranged on a second vehicle side of the transport vehicle rest on the slide linings when the transport vehicle is positioned on the receiving device.

While the transport vehicle can be "locked" on the receiving device by at least one running wheel on a first vehicle side, the running wheels on a second vehicle side may glide. This is advantageous particularly when the lift frame is moved across longer adjustment paths at high adjustment speeds and the lift guide tracks are moved along in a direction parallel to the rack aisle due to the coupling devices. If vibrations are introduced into the lift frame/the receiving devices during these overlapping actuation movements, the running wheels on the second vehicle side may "glide" relative to the second lift guide track. An adhering of the running wheels on the second vehicle side is avoided such that even in the case of vibrations, the transport vehicle does not experience abrupt shifts transverse to the longitudinal extension of the first lift guide track and second lift guide track. Overall, an excessive rotation of the transport vehicle relative to the first lift guide track and second lift guide track is thus virtually prevented.

According to a possible embodiment, the rack storage system comprises
- a conveying system for transporting unit loads, and
- a unit load manipulation unit, wherein the conveying system for transporting unit loads adjoins the unit load manipulation unit, and wherein the unit load manipulation unit comprises a first unit load transport device and a first buffer device for storage of unit loads and a second unit load transport device and a second buffer device for retrieving unit loads,
- wherein the first buffer device has provisioning devices arranged in provisioning planes located on top of each other, and the second buffer device has provisioning devices arranged in provisioning planes located on top of each other,
- wherein the first unit load transport device connects the conveying system for transporting unit loads and the provisioning devices of the first buffer device in terms of conveyance,
- wherein the second unit load transport device connects the conveying system transporting unit loads and the provisioning devices of the second buffer device in terms of conveyance, and
- wherein the at least one automated transport vehicle is movable in the rack aisle along the rack guide tracks in front of the storage places, the first buffer device and second buffer device and transports the unit loads between the first buffer device and the storage places or between the storage places and the second buffer device.

The conveying system for transporting unit loads may particularly comprise
- a first conveying device for transporting unit loads to the first unit load transport device, and
- a second conveying device for transporting unit loads away from the second unit load transport device.

The object of the invention, however, is also achieved in that one of the lift guide tracks is mounted on the lift frame so as to be adjustable in a direction perpendicular to the driving plane by an adjusting device, and the adjusting device comprises an actuating motor cooperating with the positioning system in order to position the mentioned lift guide track with respect to one of the rack guide tracks (and/or relative to the other one of the lift guide tracks) of one of the driving planes.

Generally, the height positioning of the receiving device with respect to the first rack guide track and second rack guide track is carried out by the lift drive. However, the positioning may still be insufficiently precise, for example if a change in height of the rack guide tracks is is to be expected during operation due to placing the storage racks. In this case, it is advantageous if additionally, a "fine positioning system" is provided and one of the lift guide tracks can be aligned relative to one of the first and second rack guide tracks at the height of a driving plane.

In particular, it proves advantageous if the receiving device is positioned with respect to the first rack guide track and second rack guide track by the lift drive, such that the first lift guide track is aligned relative to one of the first rack guide tracks. Subsequently, the second lift guide track is positioned by the actuating drive, independently of the first lift guide track, such that the second lift guide track is aligned relative to one of the second rack guide tracks.

If the first lift guide track is opposite the first rack guide track and the second lift guide track is opposite the second rack guide track, the transport vehicle operated in an automated manner can be moved onto the receiving device on this driving plane.

In particular, it proves advantageous if the first lift guide track is aligned higher than the first rack guide track by a compensation dimension by the lift drive, and the second lift guide track is aligned higher than the second rack guide track by a compensation dimension by the adjusting device. In this regard, the compensation dimension takes into account a weight force of the unloaded transport vehicle or loaded transport vehicle. A controller is configured to calculate the compensation dimension and/or a height compensation factor based on the weight force, wherein the controller controls the lift drive and adjusting device accordingly. As soon as the transport vehicle drives onto the lift guide tracks, the first rack guide track and the first lift guide track as well as the second rack guide track and the second lift guide track are positioned exactly relative to one another in a vertical direction in the corresponding driving plane. The transport vehicle driving over onto the receiving device may take place in a highly dynamic and particularly gentle manner.

In an advantageous embodiment of the invention, the rack storage system may be designed according to one of the previous embodiments.

BRIEF DESCRIPTION OF THE DRAWINGS

For the purpose of better understanding of the invention, it will be elucidated in more detail by the figures below.

These show in a respectively very simplified schematic representation.

DETAILED DESCRIPTION OF PREFERRED EMBODIMENTS

Figure 1A:
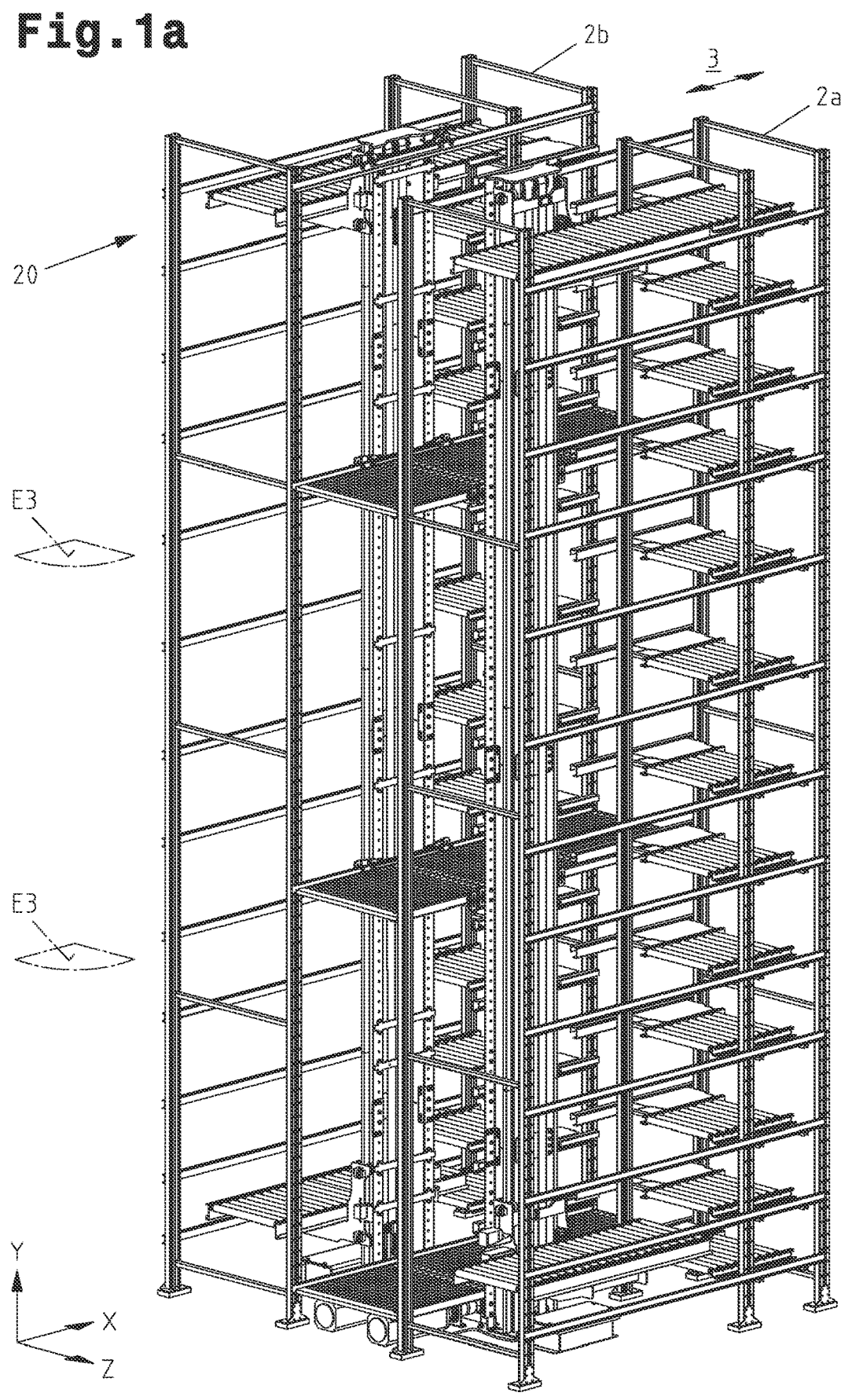
FIGS. 1a, 1b a rack storage system with a detailed view onto a unit load manipulation unit according to FIG. 1a, and with a detailed view onto a transport vehicle lifting device according to FIG. 1b.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

FIGS. 1a, 1b, 2a and 2b show a possible embodiment of a rack storage system in different views. The rack storage system comprises a first storage rack 2a, a second storage rack 2b, a rack storage system 3 between the first storage rack 2a and the second storage rack 2b, first rack guide tracks 4a, second rack guide tracks 4b, at least one transport vehicle 5 operated in an automated manner (for the sake of clarity only shown in FIG. 2b and FIG. 3), and a transport vehicle lifting device 6. The rack aisle 3 extends in an x-direction.

The first storage rack 2a and second storage rack 2b each comprises storage places 7, which are arranged in storage planes E1 located on top of each other. Unit loads 8 may be placed on the storage places 7.

The first rack guide tracks 4a and second rack guide tracks 4b extend in the direction of the rack aisle 3 and are each arranged in pairs in driving planes E2 located on top of each other. In particular, the first rack guide tracks 4a are attached to the first storage rack 2a and the second rack guide tracks 4b are attached to the second storage rack 2b.

Figure 3:
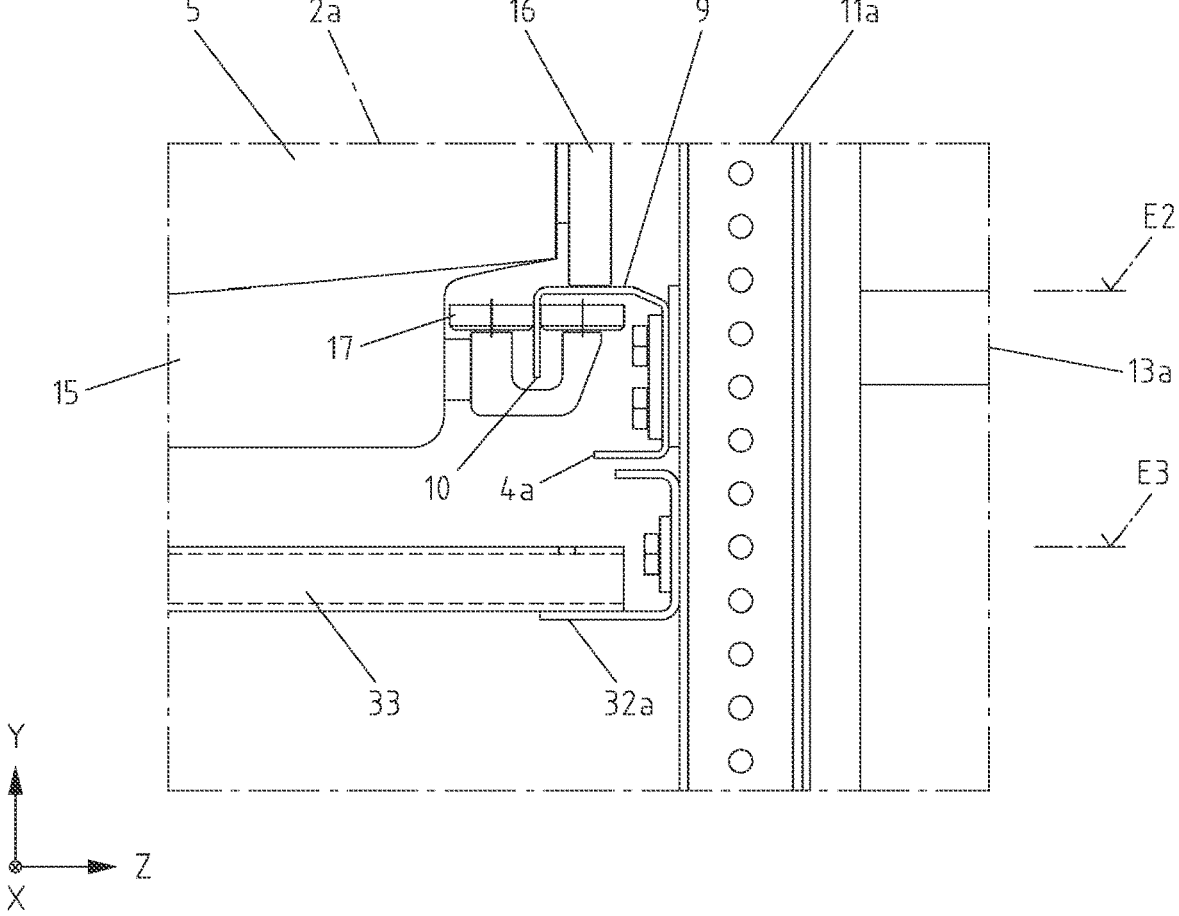
FIG. 3 a view onto a rack aisle according to FIG. 2b with a partial section of a transport vehicle.

According to a possible embodiment, in each driving plane E2, one of the rack guide tracks 4a, 4b of the rack guide tracks 4a. 4b arranged in pairs may form a first guide 9 and a second guide 10, as indicated in FIG. 3. The other one of the rack guide tracks 4a, 4b arranged in pairs forms only a first guide 9. As can be seen in FIG. 3, the first rack guide track 4a forms the first guide 9 and second guide 10. The first guide 9 extends in parallel with the longitudinal direction of the storage rack 2a. 2b and in a first guide plane extending in parallel with the driving plane E2. The second guide 10 extends in parallel with the longitudinal direction of the storage rack 2a, 2b and in a second guide plane intersecting the driving plane E2.

In particular, the first storage rack 2a comprises front rack uprights 11a, rear rack uprights 12a, front longitudinal crossbeams extending in the x-direction and connected to the front rack uprights 11a in each storage plane E1, rear longitudinal crossbeams extending in the x-direction and connected to the rear rack uprights 12a in each storage plane E1, and a rack shelf 13a with the storage places 7, arranged between the front longitudinal crossbeam and the rear longitudinal crossbeam in each storage plane E1. Preferably, the first rack guide tracks 4a are formed on the front longitudinal crossbeams.

In particular, the second storage rack 2b comprises front rack uprights 11b, rear rack uprights 12b, front longitudinal crossbeams extending in the x-direction and connected to the front rack uprights 11b in each storage plane E1, rear longitudinal crossbeams extending in the x-direction and connected to the rear rack uprights 12b in each storage plane E1, and a rack shelf 13b with the storage places 7, arranged between the front longitudinal crossbeam and the rear longitudinal crossbeam in each storage plane E1. Preferably, the second rack guide tracks 4b are formed on the front longitudinal crossbeams.

At this point, it should be noted that the number of the storage racks and rack aisles may vary. For example, the rack storage system may comprise a first storage rack, a second storage rack, a third storage rack, and a fourth storage rack. A first rack aisle is arranged between the first storage rack and the second storage rack, and a second rack aisle is arranged between the third storage rack and the fourth storage rack.

Likewise, the number of automated transport vehicles 5 may vary. Preferably, a plurality of transport vehicles 5 is provided in the only rack aisle 3 or in each rack aisle 3.

The one transport vehicle 5 or the transport vehicles 5 are particularly also designed as single-level storage-and-retrieval units and serve to store unit loads 8 and retrieve unit loads 8.

Figure 2A:
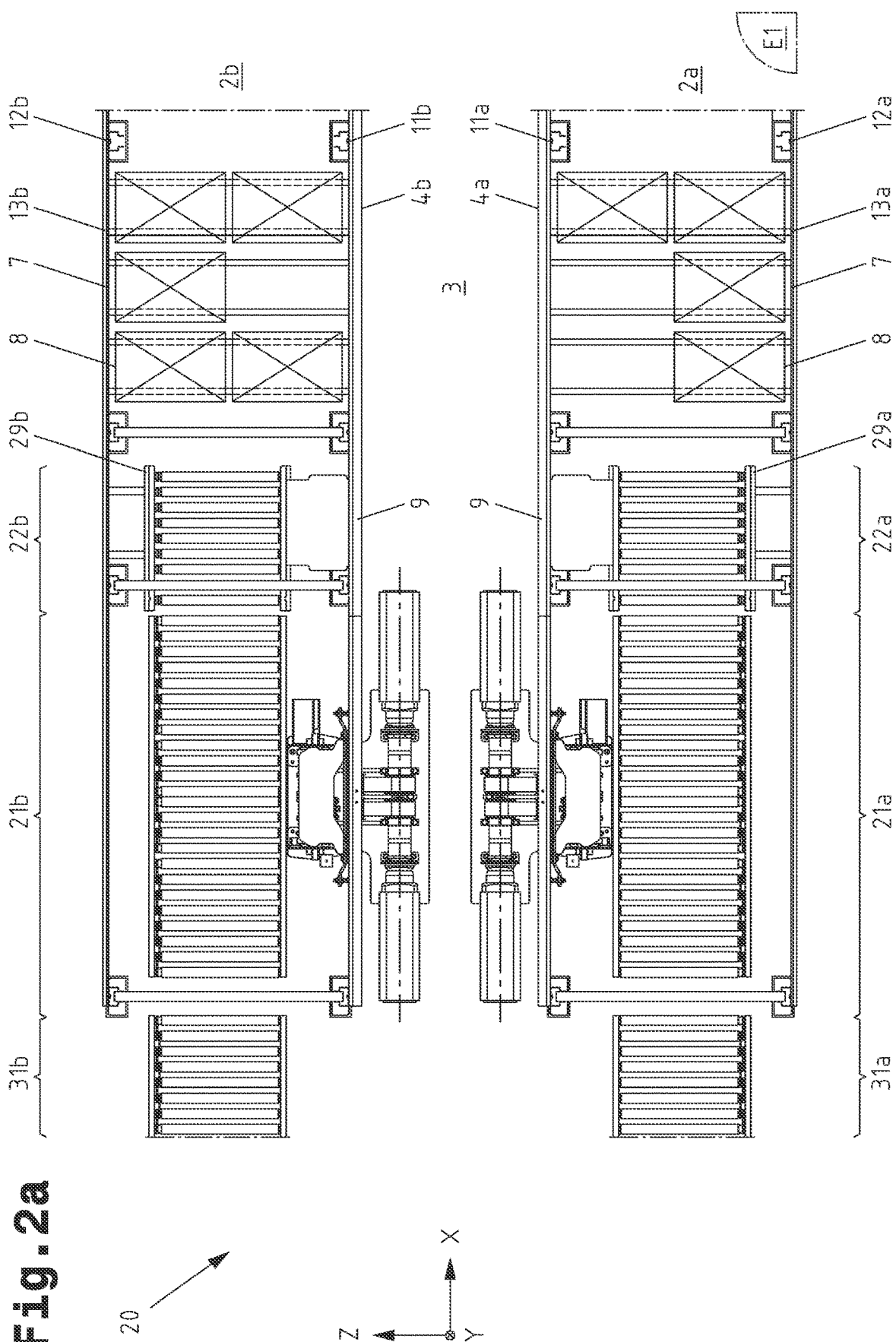
FIG. 2a, 2b the rack storage system according to FIGS. 1a, 1b in a top view.
Figure 2B:
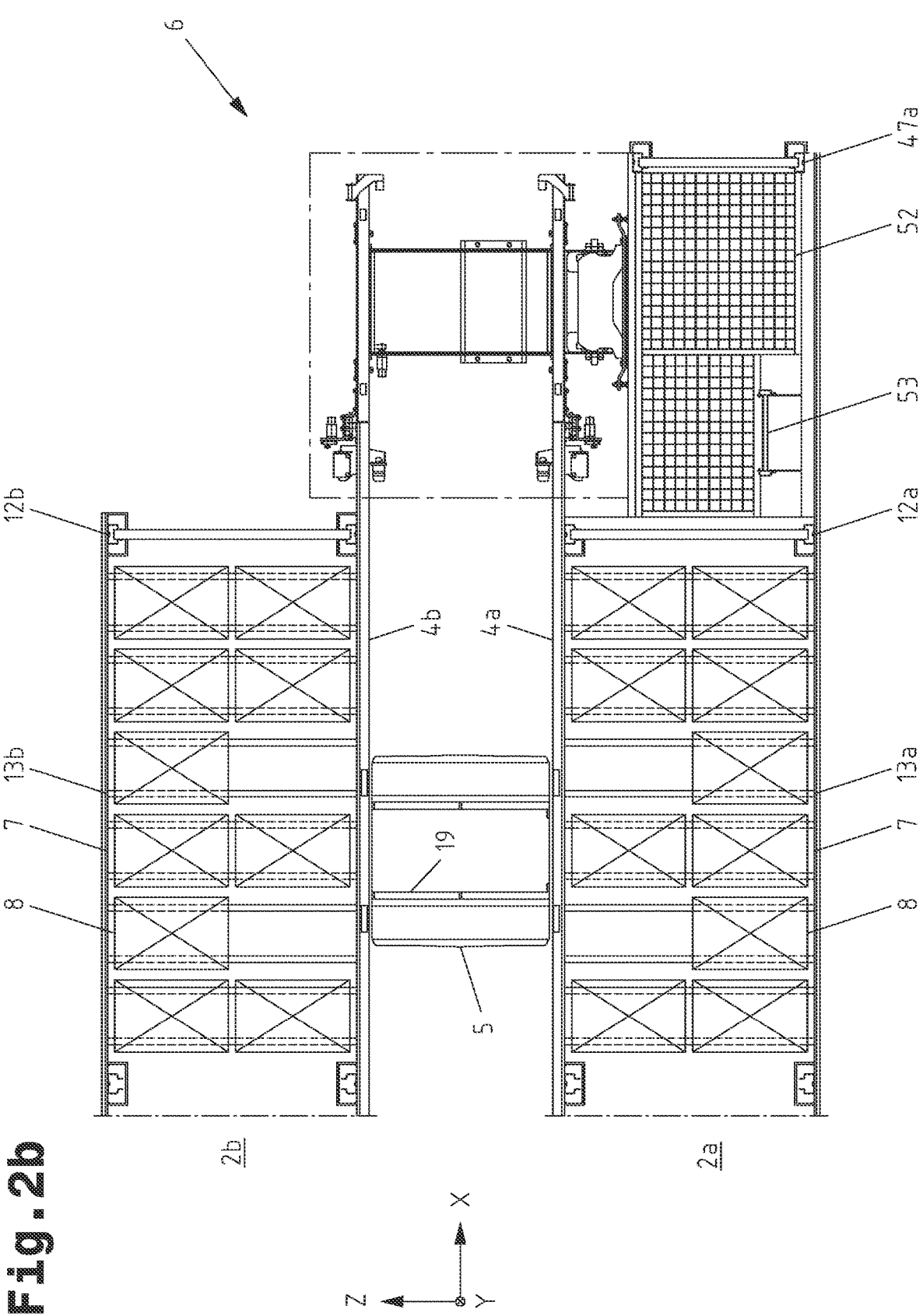

The transport vehicle 5, as depicted in FIGS. 2b and 3, comprises a base frame 15, running wheels 16, a traction drive (not shown), which is coupled to at least one running wheel 16, and a storage and retrieval device 19 schematically depicted in FIG. 2b for storing unit loads 8 and retrieving unit loads 8.

The running wheels 16 are rotatably mounted on the base frame 15, wherein first running wheels 16 lie on a first vehicle side on the first guide 9 of the first rack guide track 4a in a rollable manner, and second running wheels 16 lie on a second vehicle side on the first guide 9 of the second rack guide track 4b in a rollable manner.

As can be seen in FIG. 3, the transport vehicle 5 comprises at least one guide unit in order to move the transport vehicle 5 in a guided manner in the driving motion along the rack guide track 4a, 4b and the lift guide track of a receiving device of the transport vehicle lifting device 6 (as will be described below). The guide unit is mounted on the base frame 15 by a bearing device and comprises guide wheels 17 resting on both sides of the second guide 12 and on the second guide 10 in a rollable manner on guide sections facing away from one another.

As can be seen in FIGS. 1a and 2a, the rack storage system may additionally comprise a unit load manipulation unit 20, which has a first unit load transport device 21a and a first buffer device 22a for storage of unit loads 8 and a second unit load transport device 21b and a second buffer device 22b for retrieving unit loads 8.

Figure 4:
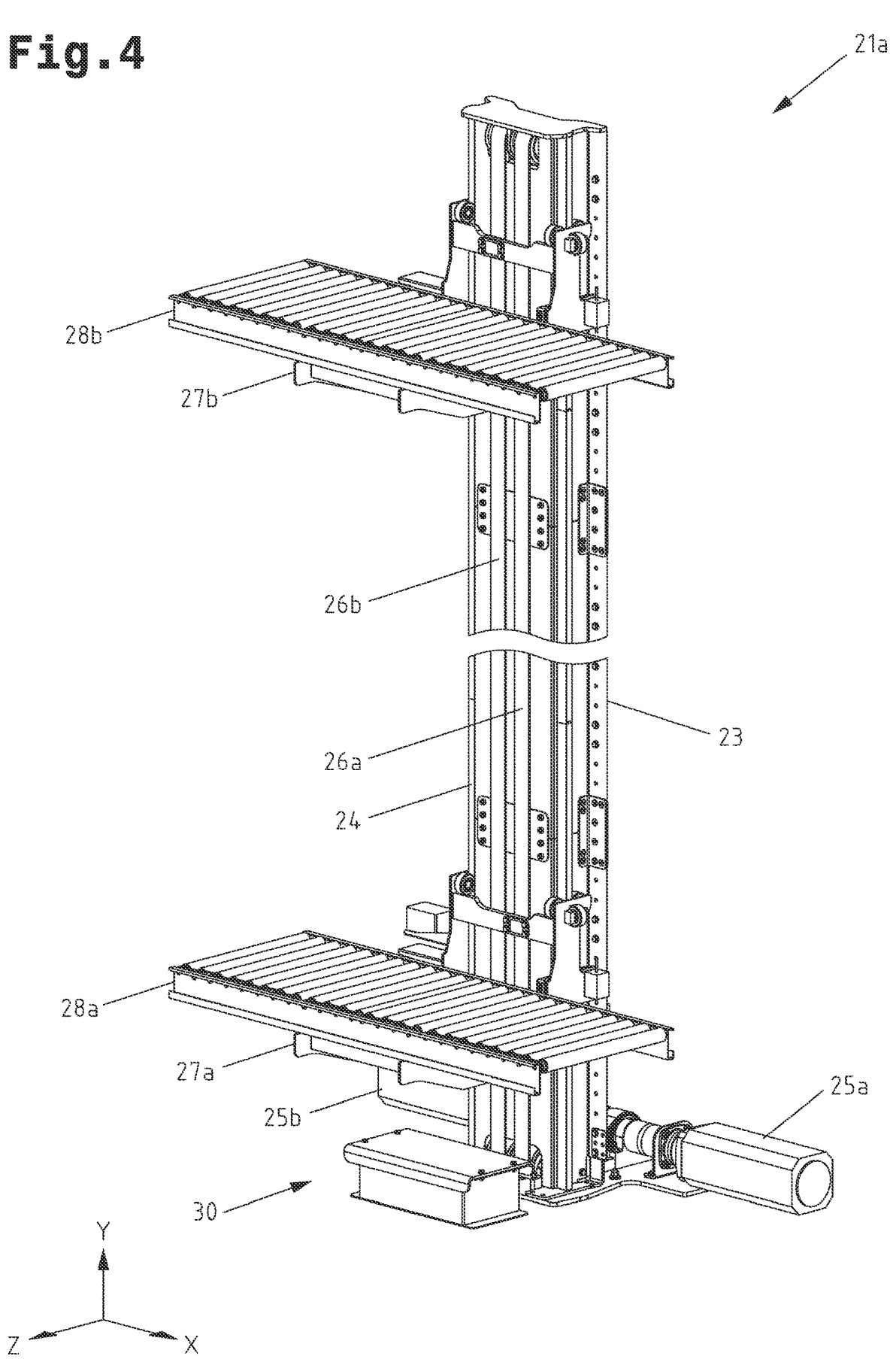
FIG. 4 a unit load lifting device of the rack storage system.

A possible embodiment of a first unit load transport device 21a is shown in more detail in FIG. 4.

According to a possible embodiment, the first unit load transport device 21a comprises:

a stationarily erected vertical mast 23 with a lift guide 24 attached to the first storage rack 2a, a first lift drive with a first drive station 25a and a first traction drive 26a, a first lift frame 27a mounted on the lift guide 24 and vertically movable by the first lift drive, which lift frame 27a is connected to the traction drive 26a of the first lift drive, and a first transport device 28a arranged on the first lift frame 27a, which is configured at least for transporting the unit loads 8 between one of the provisioning devices 29a (as will be described below) and the first transport device 28a.

According to a possible embodiment, the first unit load transport device 21a may (optionally) additionally comprise:

a second lift drive with a second drive station 25b and a second traction drive 26b.

a second lift frame 27b mounted on the lift guide 24 and vertically movable by the second lift drive, which lift frame 27b is connected to the traction drive 26b of the second lift drive, and a second transport device 28b arranged on the second lift frame 27b, which is configured at least for transporting the unit loads 8 between one of the provisioning devices 29a (as will be described below) and the second transport device 28b.

As depicted in FIG. 4, the first unit load transport device 21a may also comprise an energy-absorbing deformation device 30, which is stationarily arranged below the lift frame 27a. This way, damages to the unit load manipulation device are kept to a minimum if the traction drive were to fail (for example because a traction means of the traction drive rips) and the lift frame is not assigned a safety brake or a safety brake for the lift frame were to not react quickly enough. Advantageously, a deformation device usually has a lower constructional height than, for example, hydraulic dampers. During normal operation, the lift frame can thus be moved further downwards than would be the case, for example when using hydraulic dampers.

The first buffer device 22a comprises, at least in some of the driving planes E2, provisioning devices 29a, each designed for interim buffering of a unit load 8 or multiple unit loads 8 and arranged adjacent in the x-direction to one of the sides of the first unit load lifting device 21a or adjacent in the x-direction to both sides of the first unit load lifting device 21a.

As depicted only in FIG. 2a, a first conveying system 31a is connected to the unit load manipulation unit 20 for transporting unit loads 8 to the first unit load transport device 21a, wherein the first unit load transport device 21a connects the first conveying system 31a and the provisioning devices 29a in terms of conveyance.

A possible embodiment of a second unit load transport device 21b is not shown in detail as it corresponds to the first unit load transport device 21a.

With respect to FIG. 4 and according to a possible embodiment, the second unit load transport device 21b comprises:

a stationarily erected vertical mast 23 with a lift guide 24 attached to the first storage rack 2b, a first lift drive with a first drive station 25a and a first traction drive 26a, a first lift frame 27a mounted on the lift guide 24 and vertically movable by the first lift drive, which lift frame 27a is connected to the traction drive 26a of the first lift drive, and a first transport device 28a arranged on the first lift frame 27a, which is configured at least for transporting the unit loads 8 between one of the provisioning devices 29b (as will be described below) and the first transport device 28a.

According to a possible embodiment, the second unit load transport device 21b may (optionally) additionally comprise:

a second lift drive with a second drive station 25b and a second traction drive 26b, a second lift frame 27b mounted on the lift guide 24 and vertically movable by the second lift drive, which lift frame 27b is connected to the traction drive 26b of the second lift drive, and a second transport device 28b arranged on the second lift frame 27b, which is configured at least for transporting the unit loads 8 between one of the provisioning devices 29b (as will be described below) and the second transport device 28b.

The second buffer device 22b comprises, at least in some of the driving planes E2, provisioning devices 29b, each designed for interim buffering of a unit load 8 or multiple unit loads 8 and arranged adjacent in the x-direction to one of the sides of the second unit load lifting device 21b or adjacent in the x-direction to both sides of second unit load lifting device 21b.

As depicted only in FIG. 2a, a second conveying system 30b is connected to the unit load manipulation unit 20 for transporting unit loads 8 away from the second unit load transport device 21b, wherein the second unit load transport device 21b connects the second conveying system 30b and the provisioning devices 29b in terms of conveyance.

According to the embodiment shown, the first unit load transport device 21a and second unit load transport device 21b are provided separately of one another. Apart from that, the first unit load transport device 21b and second unit load transport device 21b may also be combined and be formed by a single unit load transport device. According to this embodiment, the first transport device 28a and the second transport device 28b are mounted on a single vertical mast 23. Optionally, only one transport device may be provided. According to this embodiment, a first conveying system for transporting unit loads to the unit load transport device and a second conveying system for transporting unit loads 8 away from the second unit load transport device are connected to the unit load manipulation unit 20.

As can be seen in FIGS. 1a and 3, the rack storage system may also have mounting crossbeams 32a provided on the first storage rack 2a and mounting crossbeams 32b provided on the second storage rack 2b, in maintenance planes E3 located on top of each other, wherein walkways 33 (not depicted in FIGS. 2a and 2b for the sake of clarity) are attached on the mounting crossbeams 32a, 32b. This allows maintenance work to be carried out in each maintenance plane E3.

Figure 1B:
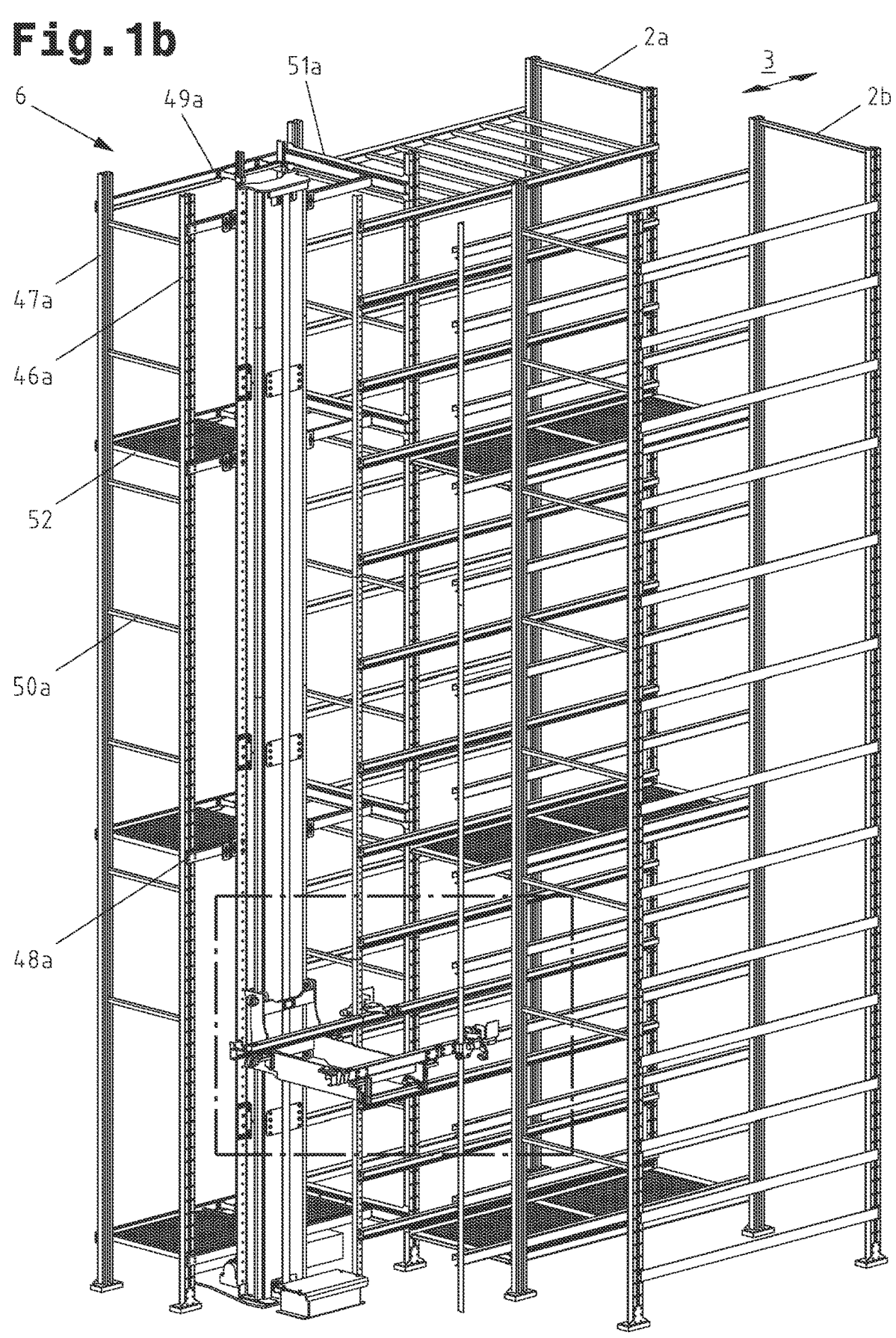

As can be seen in FIGS. 1b and 2b, one of the first and second storage racks 2a, 2b additionally comprises a front rack upright 46a, a rear rack upright 47a, and front mounting crossbeams 48a and rear mounting crossbeams 49a in each maintenance plane E3. The front mounting crossbeams 48a and rear mounting crossbeams 49a in each maintenance plane E3 extend in parallel with the rack guide tracks 4a. The front rack upright 46a and rear rack upright 47a may be connected to one another by horizontally extending first frame profiles 50a, each attached with their first end to the front rack upright 46a and with their second end to the rear rack upright 47a. It is also possible that additionally, horizontally extending second frame profiles 51a are provided on the front rack upright 11a and rear rack upright 12b, each attached with their first end to the front rack upright 11a and with their second end to the rear rack upright 12a.

As depicted in FIG. 1b, walkways 52 are attached to the front mounting crossbeams 48a and rear mounting crossbeams 49a in each maintenance plane E3, and the maintenance planes E3 are accessible via a ladder 53. This allows maintenance work to be carried out on the transport vehicle lifting device 6 in each maintenance plane E3.

In the following, the transport vehicle lifting device 6 is described in more detail with the aid of FIGS. 1b, 2b, 5 to 14. Such a transport vehicle lifting device 6 is used primarily if fewer transport vehicles 5 than driving planes E2 are present within the rack aisle 3, or if an additional transport vehicle 5 is needed on a driving plane E2. Additionally, such a transport vehicle lifting device 6 may be used to transport a transport vehicle 5 between a driving plane E2 and a transfer plane, in which the transport vehicle 5 can be transferred between a receiving device (as will be described below) and a buffering system disclosed in EP 2 673 219 B1.

The transport vehicle lifting device 6 comprises a vertically extending guide frame 59 and a lift frame 60 mounted thereon so as to be adjustable by a lift drive, wherein a receiving device 61 is arranged on the lift frame 60.

Figure 6:
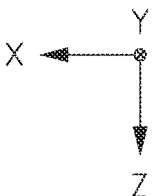
FIG. 6 an enlarged detail from FIG. 2b with a top view onto a guide frame of the transport vehicle lifting device and the attachment of the guide frame on the first storage rack.
Figure 6:
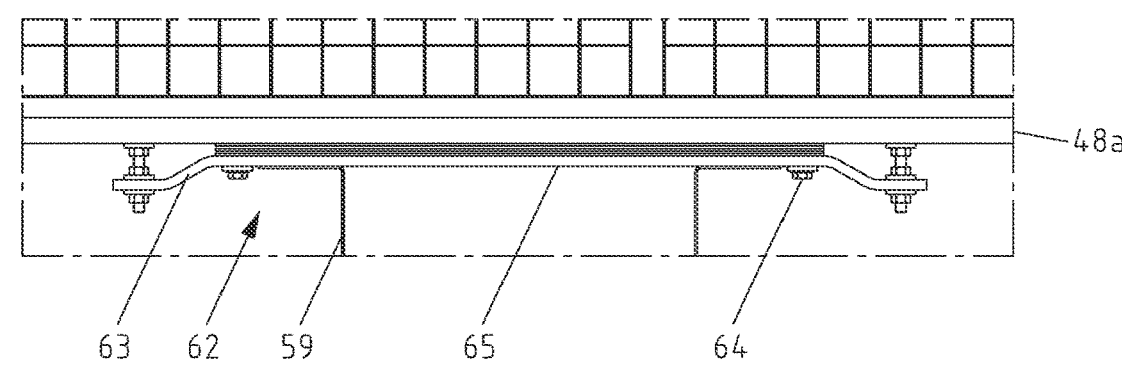
Figure 5:
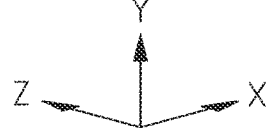
FIG. 5 a transport vehicle lifting device of the rack storage system in a first embodiment with an additional adjusting device for a second lift guide track.

As can be seen in FIGS. 5 and 6, on a rear side facing away from the lift frame 60, the guide frame 59 forms a mounting section 62, wherein the transport vehicle lifting device 6 is mounted on the front mounting crossbeams 48a by the mounting section 62. Specifically, the connection between the guide frame 59 and the mounting crossbeams 48a is established by cranked (meaning angled twice) fastening elements 63. Alternatively, single-angled fastening elements 63 may also be used. Specifically, the guide frame 59 is connected to the mounting crossbeams 48a via connecting means 64. In the example shown, screws are provided as connecting means 64. However, a connection by rivets or clamps is also conceivable. Due to the guide frame 59 being attached to multiple mounting sections 62 located vertically on top of each other, the guide frame 59 is extraordinarily stable, in particular against rotation, despite the open profile cross-section described below, even at mast heights of 30 to 40 m.

FIG. 6 shows that for the perpendicular alignment of the guide frame 59 and/or for compensating the distance between the guide frame 59 and the mounting crossbeams 48a, different numbers and/or thicknesses of distance plates 65 may be inserted between the guide frame 59 and the mounting crossbeams 48a.

Figure 7:
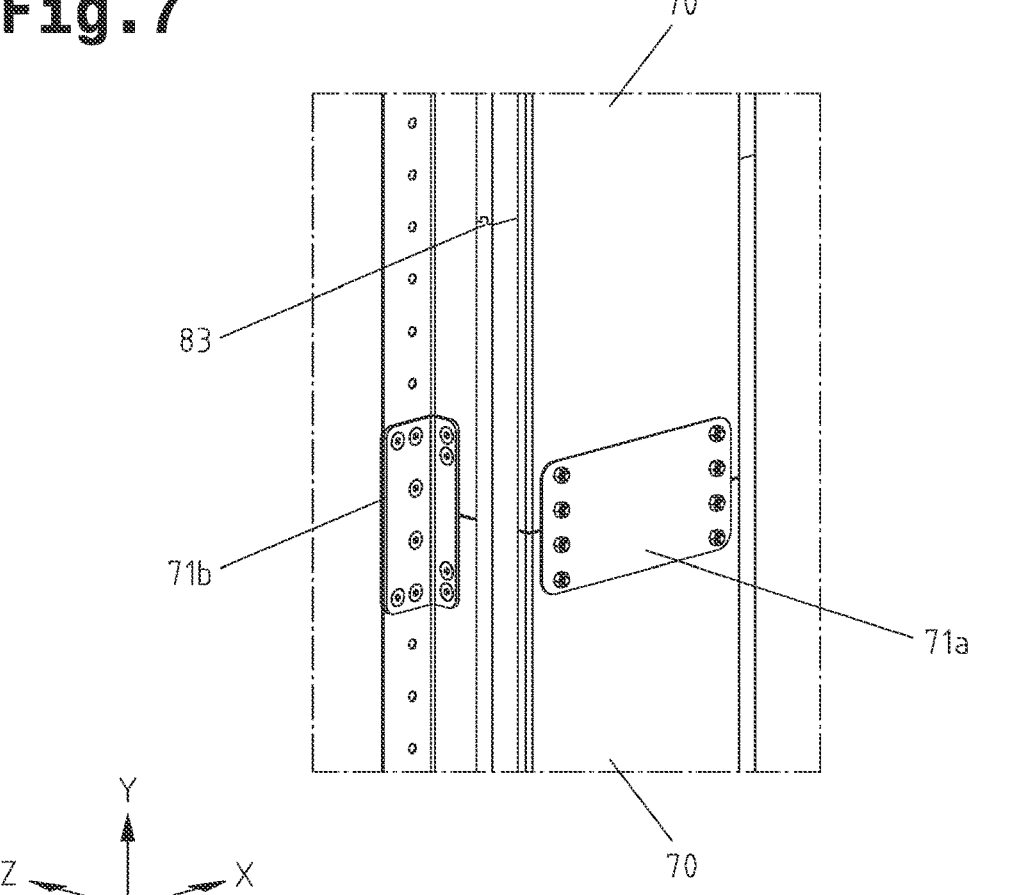
FIG. 7 an enlarged detail from FIG. 5 with the guide frame and the arrangement of guide frame segments.

In the exemplary embodiment shown, the guide frame 59 comprises a plurality of guide frame segments 70, which are joined vertically on top of each other with essentially no gaps, as it is shown in FIGS. 5 and 7. The guide frame segments 70 are preferably screwed together, for example using connecting plates 71*a*, 71*b*.

Figure 8:
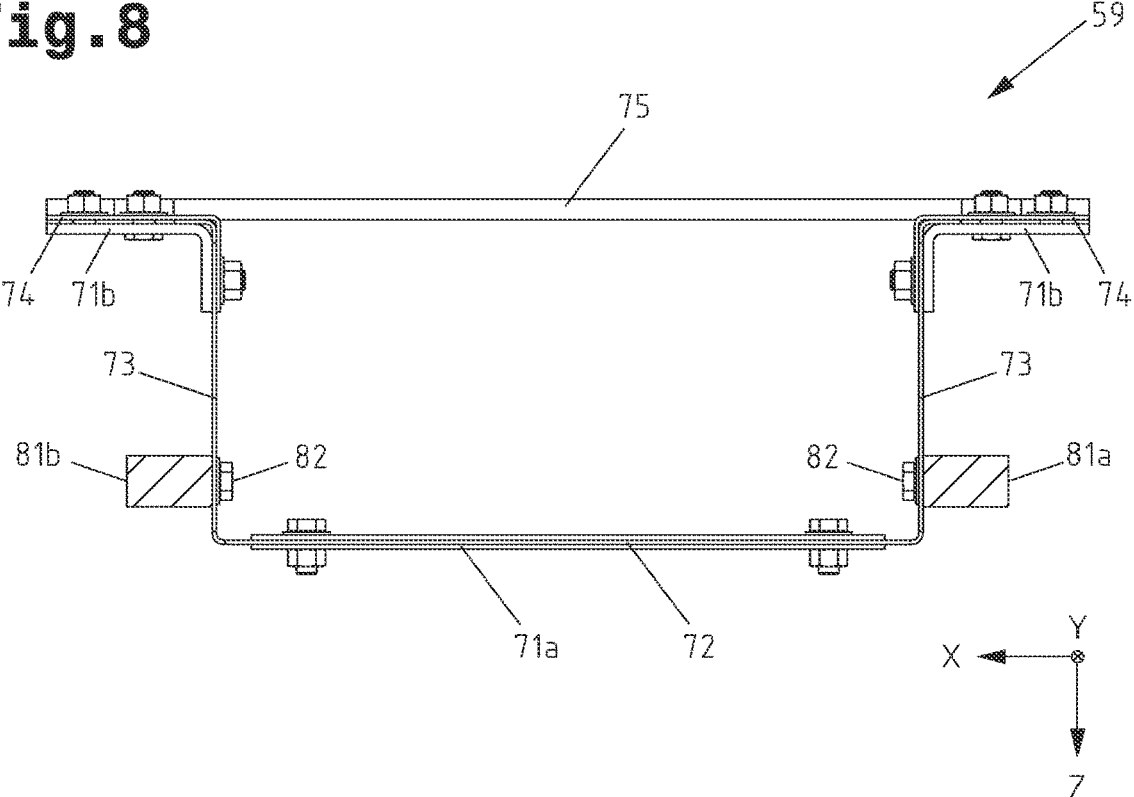
FIG. 8 the guide frame and the guide assembly for a lift frame, in a cross-sectional representation.

As shown in FIG. 8, the guide frame 59 has an open profile cross-section, wherein the profile cross-section comprises a profile base 72, profile limbs 73 projecting therefrom, and mounting limbs 74 angled on the free ends of the profile limbs 73, wherein the guide frame 59 is fastened to the front mounting crossbeams 48*a* of the first storage rack 2*a* by the mounting limbs 74.

The profile cross-section may thus, in particular, be C-shaped (with mounting limbs bent inwards) or U-shaped with mounting limbs pointing outwards, in particular bent outwards. Due to the open design, the extensions on the guide frame 59 are easily accessible, whereby not only the production of the transport vehicle lifting device 6 but also its maintenance is made easier. The mounting limbs are directed outwards or inwards about a vertical axis of the guide frame 59 (in particular bent around a vertical axis) and offer a rest surface for mounting the guide frame 59 to the front mounting crossbeams 48*a*. The stability of the guide frame 59 can be further increased by connecting struts 75. These are arranged on the rear side of the guide frame 59 and are fastened to the mounting limb 74 by connecting means, in particular screws, as can be seen in FIG. 8.

Due to the guide frame 59 being attached to the first storage rack 2*a*, in particular to multiple mounting sections 62 located vertically on top of each other, the guide frame 59 is extraordinarily stable, in particular against rotation and even at mast heights of 30 to 40 m, despite the open design. Moreover, it is advantageous that the material usage is low and also the weight is reduced to a minimum. This makes easier mounting with little technical effort possible, and the transport costs are low, as well. Generally, it is also conceivable that the vertical mast has a closed cross-section and is designed, in particular, as a rectangular tube. The guide frame 59 then has a particularly high degree of torsional stiffness.

Even though the open design of the guide frame 59 is advantageous, it would generally also be conceivable that the guide frame 59 has a closed profile cross-section and is designed, in particular, as a rectangular tube.

In FIGS. 5, 7 and 8, it can be seen that the guide frame 59 is provided with a guide assembly, wherein the receiving device 61 is arranged on the lift frame 60 and the lift frame 60 is mounted on the guide assembly. In this example, the guide assembly comprises a first guide rail 81*a* and a second guide rail 81*b*, which extend separately of one another and parallel in the longitudinal direction of the guide frame 59 and are connected, preferably in a releasable manner, to the guide frame 59 by connecting means 82. In particular, the first guide rail 81*a* and the second guide rail 81*b* are formed of bright drawn or polished flat steel, which has threaded bores for fastening the same to the guide frame 59 with the aid of screws. Despite the cost-effective and modular design, the lift frame 60 runs smoothly on the guide assembly, and only low vibrations are introduced into the guide frame 59.

Additionally, the guide assembly for guiding the first lift frame 60 is advantageously subdivided in the vertical direction by butt joints 83 complementary in shape. In particular, a division may be arranged between the guide frame segments 70 offset to the butt joints 83 of the guide assembly in the vertical direction, as it is the case in the present example.

By the suggested measures, the transport of the guide frame 59 and its introduction into the building at the installation location is facilitated on the one hand, and its division allows a modular design of the transport vehicle lifting device 6 on the other hand. Specifically, depending on the required lift height, different numbers of guide frame segments 70 can be assembled to form a guide frame 59. The guide frame segments 70 are preferably screwed together, for example using the connecting plates 71*a*, 71*b*. Since the butt joint 83 of the guide assembly is not arranged at the same height as a division between two guide frame segments 70, an (undesired) shifting of guide frame segments 70 relative to one another, as it may occur due to stresses of the guide frame segments 70 relative to one another, has no or only a small effect on the butt joints 83 of the guide assembly. Thereby, the occurrence of vibrations and/or oscillations upon movement of the lift frame 60 can be kept to a minimum. Furthermore, a bending load introduced by the lift frame 60 into the guide assembly at the guide frame 59 is directed over the butt joint of the guide frame segments 70.

Figure 9:
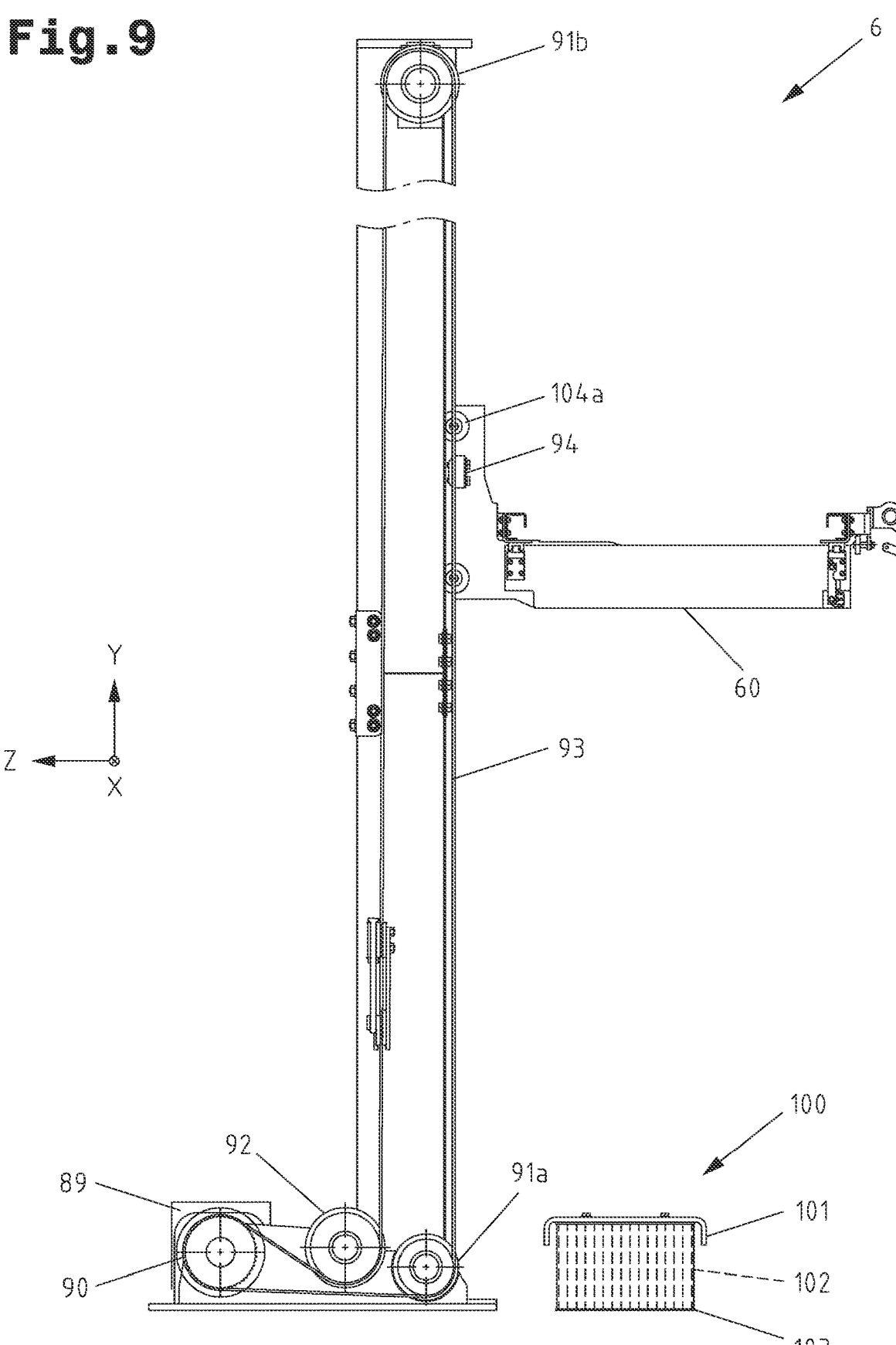
FIG. 9 the transport vehicle lifting device in a lateral view and with a representation of the lift drive for the lift frame.

The lift drive, as it can be seen in FIGS. 5 and 9, comprises a drive station and a traction drive. The drive station comprises at least one lifting motor 89. The lifting motor 89 is, for example, a servomotor with a rotary encoder, for example an incremental encoder.

The traction drive may comprise a drive wheel 90, a lower deflection wheel 91*a*, an upper deflection wheel 91*b*, possibly a guide wheel 92, and a traction means 93 guided around the drive wheel 90, the lower deflection wheel 91*aa*, the upper deflection wheel 91*b*, and possibly the guide wheel 92. The drive wheel 90 is coupled with the lifting motor 89. The lift frame 60 is coupled to the traction means 93 by a clamp 94.

The lower deflection wheel 91*a* is arranged in the foot region of the guide frame 59, and the upper deflection wheel 91*b* is arranged in the head region of the guide frame 59.

If a guide wheel 92 is provided, it is arranged in the foot region of the guide frame 59 between the lower deflection wheel 91*a* and the drive wheel 90. The drive wheel 90 is arranged at a distance from the guide frame 59 and in the foot region of the guide frame 59.

As shown in detail in FIG. 9, the transport vehicle lifting device 6 may comprise an energy-absorbing deformation device 100, which is stationarily arranged below the receiving device 61 and/or below the lift frame 60. For example, the deformation device 100 is mounted directly on a floor.

Advantageously, the energy-absorbing deformation device 100 comprises a force distribution plate 101 with an impact surface for the receiving device 61 and/or the lift frame 60, and a honeycomb body 102 that is plastically deformable by application of force, below the force distribution plate 101, which honeycomb body 102 at least partially absorbs the impact energy occurring upon collision of the receiving device 61 and/or the lift frame 60 with the force distribution plate 101, and a mounting plate 103 below the honeycomb body 102 for mounting the deformation device 100.

The cavities of the honeycomb body 102 extend in the vertical direction.

Figure 10A:
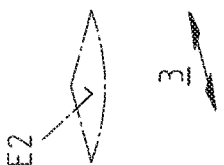
FIG. 10a an enlarged detail of the rack storage system and with a representation of the end stop buffers, which are moved into a stop position.
Figure 10B:
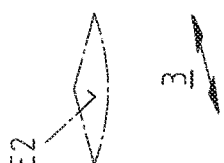
FIGS. 10b, 10d an enlarged detail of the rack storage system and with a representation of the end stop buffers, which are moved into a release position.
Figure 10C:
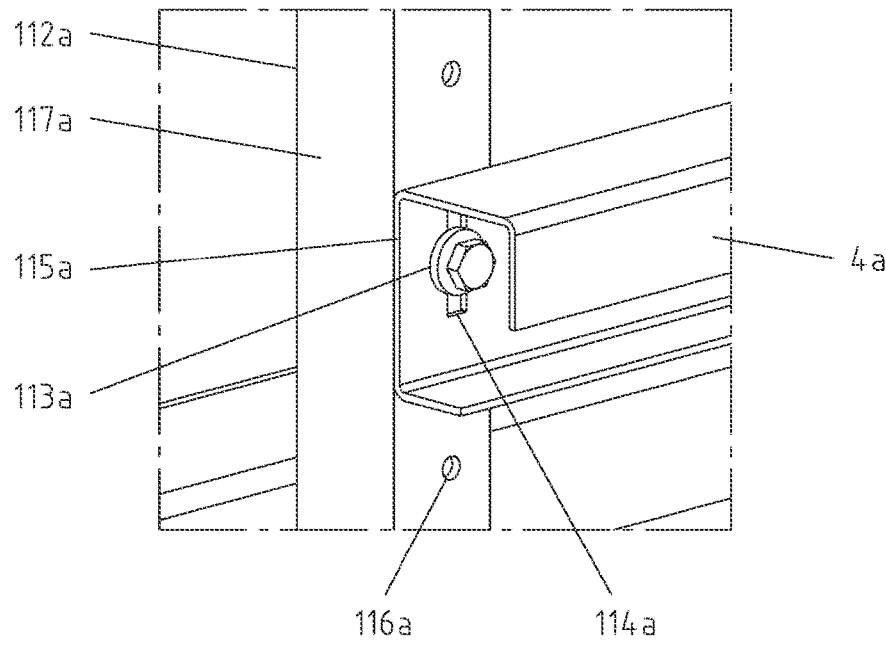
FIG. 10c an enlarged detail of the rack storage system and with a representation of a first guide profile and the attachment of the guide profile on the rack guide tracks.
Figure 10D:
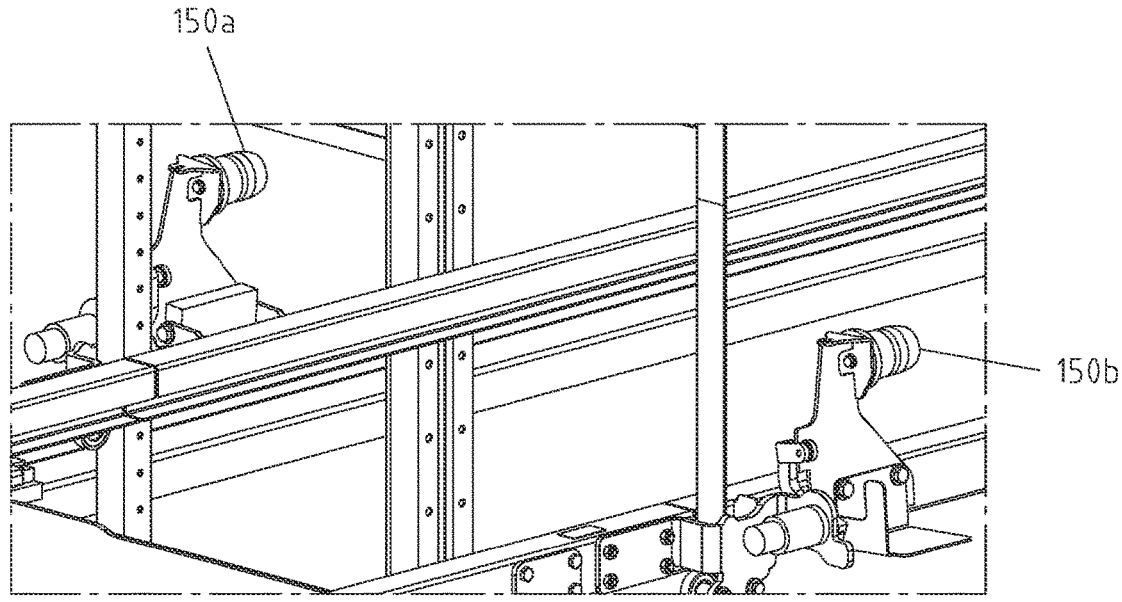
Figure 11:
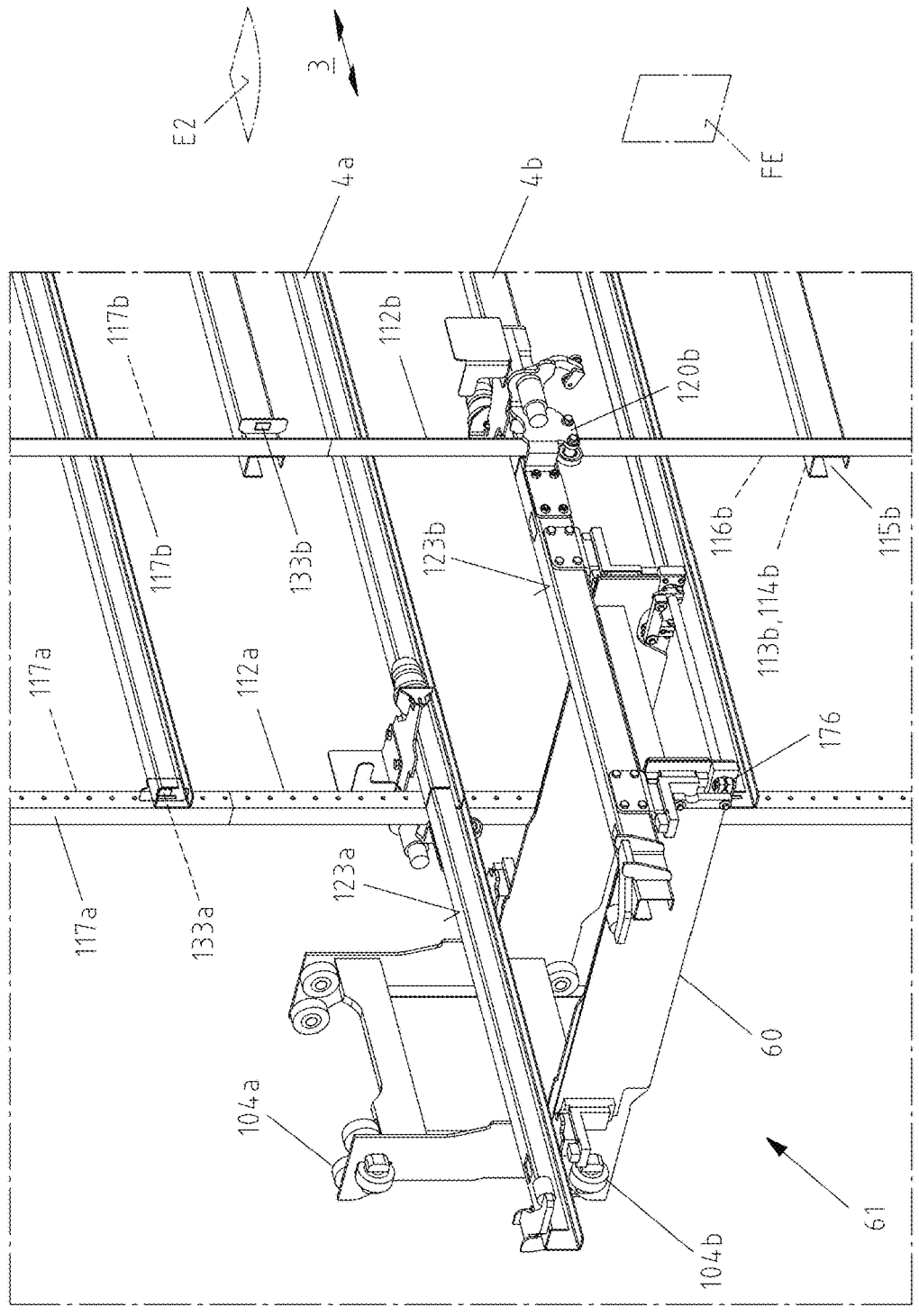
FIG. 11 a detailed view onto a lift frame and the receiving device of the transport vehicle lifting device.

In FIGS. 10*a* to 10*d*, 11, and 12, the receiving device 61 mounted on the guide frame 59 by the lift frame 60 is shown in more detail. The lift frame 60 comprises guide wheels 104*a*, 104*b* resting on the guide rails 81*a*. 81*b* in a rollable manner and is coupled to the traction means 93. For the sake of clarity, FIG. 11 shows a simplified representation of FIG. 10*a*.

The receiving device 61 comprises lift guide tracks 110*a*, 110*b* extending in a direction parallel to the rack guide tracks 4*a*. 4*b* and positionable relative to the rack guide tracks 4*a*, 4*b*. By the receiving device 61, the transport vehicle 5 can be transported between a first driving plane E2 and a second driving plane E2 or between a driving plane E2 and a transfer plane to a buffering system, as described above.

The first lift guide track 110*a* is mounted on the lift frame 60 so as to be movable in a direction parallel to the rack guide tracks 4*a* by a first guide device (x-guide device) and is coupled to a first guide profile 112*a* by a first coupling device 111*a*.

The second lift guide track 110*b* is mounted on the lift frame 60 so as to be movable in a direction parallel to the rack guide tracks 4*b* by a second guide device (x-guide device) and is coupled to a second guide profile 112*b* by a second coupling device 111*b*.

The first lift guide track 110*a* and/or the second lift guide track 110*b* can be adjusted, particularly smoothly, between a rear relative position (see dotdashed plane X1 in FIG. 5) and a front relative position (see dotdashed plane X2 in FIG. 5).

The first guide profile 112*a* extends essentially parallel to the guide frame 59 and is connected to the rack guide tracks 4*a* on the first storage rack 2*a*. The second guide profile 112*b* extends essentially parallel to the guide frame 59 and is connected to the rack guide tracks 4*b* on the second storage rack 2*b*.

In particular, the first guide profile 112*a* is connected to the rack guide tracks 4*a* by mans of connecting means 113*a*, and the second guide profile 112*b* is connected to the rack guide tracks 4*b* by connecting means 113*b*. In the example shown, screws are provided as connecting means 113*a*, 113*b*. However, a connection by rivets or clamps is also conceivable.

As can be seen in FIG. 10*c* and FIG. 11, the first rack guide track 4*a* forms a mounting section at the end adjacent to the transport vehicle lifting device 6, in which mounting section a prefabricated passage opening 114*a* is provided. The passage opening 114*a* is arranged at a predetermined clearance from the end edge 115*a* of the first rack guide track 4*a*. Preferably, the passage opening 114*a* is designed as a longitudinal slot, which extends in the direction of the longitudinal extension of the first guide profile 112*a* The second rack guide track 4*b* forms a mounting section at the end adjacent to the transport vehicle lifting device 6, in which mounting section a prefabricated passage opening 114*b* is provided. The passage opening 114*b* is arranged at a predetermined clearance from the end edge 115*b* of the second rack guide track 4*b*. Preferably, the passage opening 114*b* is designed as a longitudinal slot, which extends in the direction of the longitudinal extension of the second guide profile 112*b*.

It proves advantageous if the first guide profile 112*a* comprises a prefabricated row of passage openings 116*a*, wherein the row extends in the direction of the longitudinal extension of the first guide profile 112*a*. Likewise, the second guide profile 112*b* comprises a prefabricated row of passage openings 116*b*, wherein the row extends in the direction of the longitudinal extension of the second guide profile 112*b*. The passage openings 116*a*, 116*b* are arranged either continuously in a row across the entire length of the first guide profile 112*a*/second guide profile 112*b* or in an interrupted manner in a row, in each case only in mounting sections of the first guide profile 112*a*/second guide profile 112*b*. According to the latter embodiment, however, a plurality of passage openings 116*a*, 116*b* are present in each mounting section of the respective first guide profile 112*a*/ second guide profile 112*b*. The passage openings 116*a*, 116*b* may be provided at a random grid distance. For example, the passage openings 116*a*, 116*b* are through-bores.

Preferably, the first guide profile 112*a* forms the prefabricated row of passage openings in a mounting section, and preferably, the second guide profile 112*b* forms the prefabricated row of passage openings at a mounting section.

The first guide profile 112*a* forms guideways 117*a* facing away from each other, and the second guide profile 112*b* forms guideways 117*b* facing away from each other.

Preferably, the first guide profile 112*a* forms the guideways 117*a* facing away from each other at a (first) guide section, and preferably, the second guide profile 112*b* forms the guideways 117*b* facing away from each other at a (second) guide section.

The (first) guide section extends in a vertical guide plane FE oriented perpendicularly to the rack aisle 3. Likewise, the (second) guide section 114*b* extends in a vertical guide plane FE oriented perpendicularly to the rack aisle 3.

According to the shown embodiment, the first guide profile 112*a* and the second guide profile 112*b* have an L-shaped cross-section. Generally, the first guide profile 112*a* and the second guide profile 112*b* may also have a rectangular cross-section.

Figure 12:
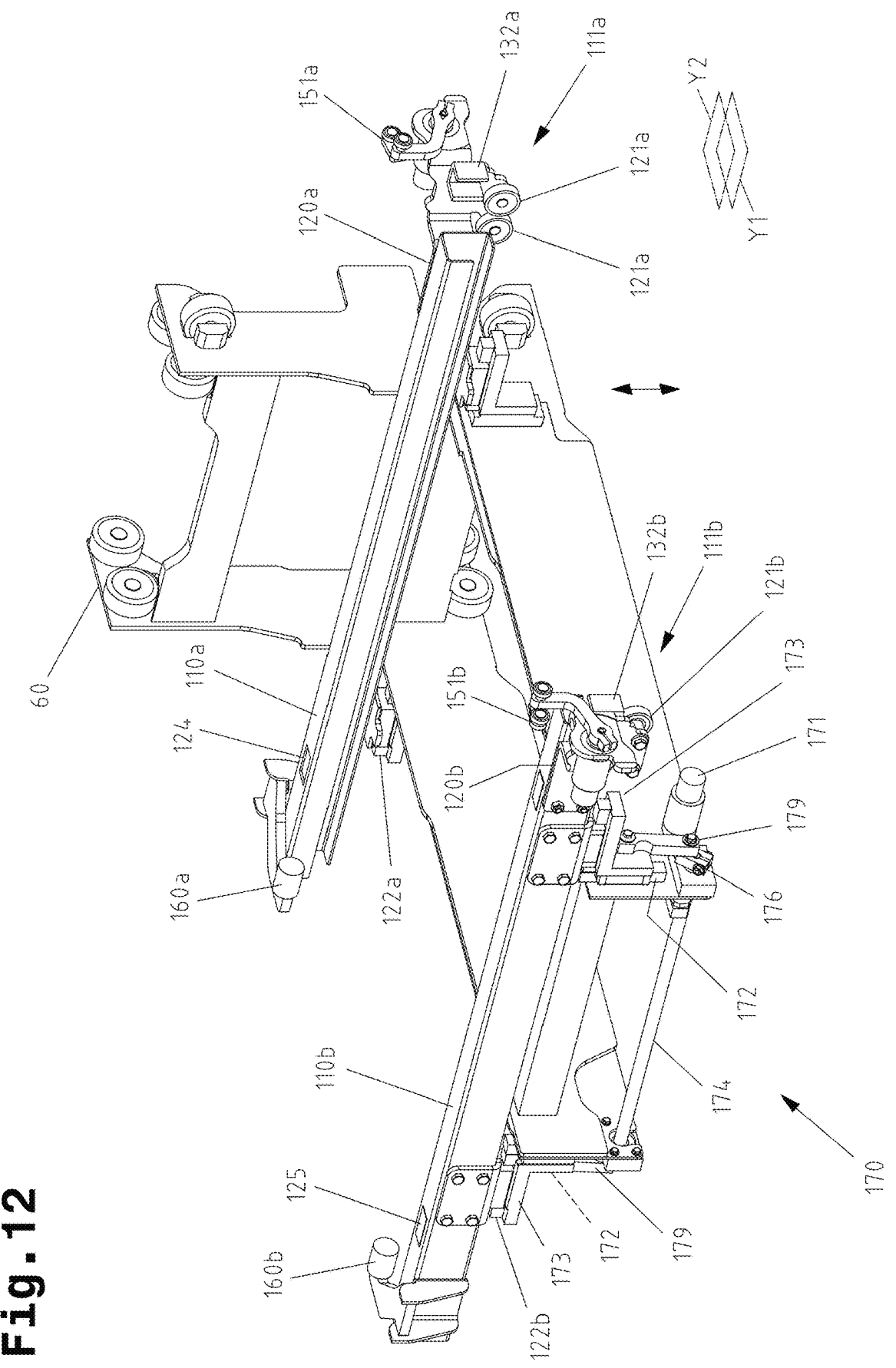
FIG. 12 a detailed view onto an adjusting device for one of the lift guide tracks, the lift frame and the receiving device of the transport vehicle lifting device.
Figure 14:
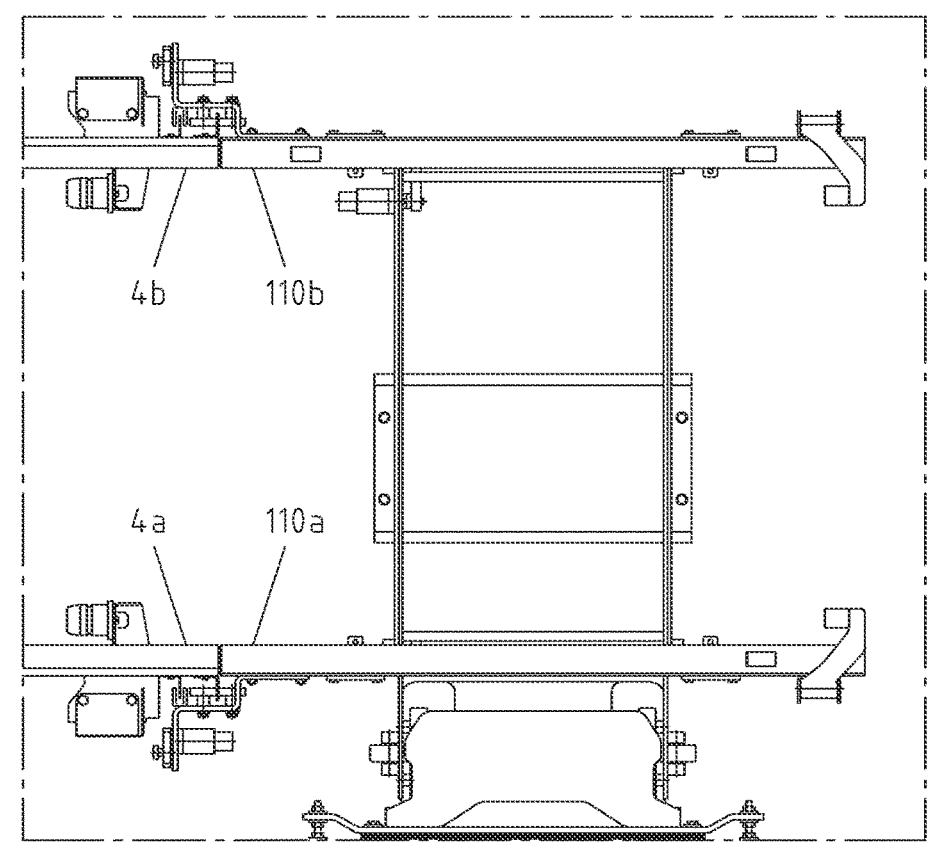
FIG. 14 an enlarged detail from FIG. 2b.

FIGS. 12 and 14 show the first coupling device 111*a* and second coupling device 111*b* in more detail. The first coupling device 111*a* comprises a holder 120*a* and guide wheels 121*a* mounted thereon so as to be rotatable about horizontal axes, which guide wheels 121*a* rest in a rollable manner on the guideways 117*a* facing away from each other on the first guide profile 112*a*. The holder 120*a* is preferably fastened, in particular screwed, to the first lift guide track 110*a* The second coupling device 111*b* comprises a holder 120*b* and guide wheels 121*b* mounted thereon so as to be rotatable about horizontal axes, which guide wheels 121*b* rest in a rollable manner on the guideways 117*b* facing away from each other on the second guide profile 112*b*. The holder 120*b* is preferably fastened, in particular screwed, to the second lift guide track 110*b*.

According to the embodiment shown, the first guide device (x-guide device) comprises linear guides 122*a* extending in a direction parallel to the rack guide tracks 4*a*. The linear guides 122*a* each comprise a guide track and a guide carriage mounted thereon. The guide track is preferably mounted on the lift frame 60, and the lift guide track 110*a* is mounted on the guide carriage. In particular, the guide carriage is connected, in particular screwed, to the lift guide track 110*a*. According to the embodiment shown, the second guide device (x-guide device) comprises linear guides 122*b* extending in a direction parallel to the rack guide tracks 4*b*. The linear guides 122*b* each comprise a guide track and a guide carriage mounted thereon. The guide track is preferably mounted on the lift frame 60, and the lift guide track 110*b* is mounted on the guide carriage. In particular, the guide carriage is connected, in particular screwed, to the lift guide track 110*b*.

As described above, the first guide profile 112*a* is positioned relative to the end edge 115*a* of the first rack guide track 4*a* in each driving plane E2 and is connected to the first rack guide track 4*a* at a defined clearance from the end edge 115*a* in each driving plane E2. Likewise, the second guide profile 112*b* is positioned relative to the end edge 115*b* of the second rack guide track 4*b* in each driving plane E2 and is connected to the second rack guide track 4*b* at a defined clearance from the end edge 115*b* in each driving plane E2.

Due to manufacturing tolerances and mounting-related discrepancies, the end edges 115a of the first rack guide tracks 4a arranged on top of each other/the end edges 115b of the second rack guide tracks 4b arranged on top of each other cannot be aligned precisely with respect to each other but rather offset with respect to a vertical plane in the direction of the rack aisle 3. While, in a first driving plane E2, the end edge 115a of the first rack guide track 4a/the end edge 115b of the second rack guide track 4b may project at the vertical plane, in a second driving plane E2, the end edge 115a of the first rack guide track 4a/the end edge 115b of the second rack guide track 4b may end before the vertical plane.

In each driving plane E2, the first guide profile 112a is positioned relative to the first end edge 115a (possibly offset from the vertical plane) of the first rack guide track 4a and is connected to the first rack guide track 4a at the defined clearance from the end edge 115a in each driving plane E2, so that the first guide profile 112a follows the course of the first end edges 115a. Likewise, the second guide profile 112b is positioned relative to the second end edge 115b (possibly offset from the vertical plane) of the second rack guide track 4b in each driving plane E2 and is connected to the second rack guide track 4b at a defined clearance from the end edge 115b in each driving plane E2, so that the second guide profile 112b follows the course of the second end edges 115b.

It is particularly advantageous if the first lift guide track 110a and the second lift guide track 119b are mounted on the lift frame 60 so as to be independently movable in a direction parallel to the rack guide tracks 4a, 4b.

Thus, a positional deviation between the first end edge 115a of the first rack guide track 4a and the second end edge 115b of the second rack guide track 4b in each driving plane E2 may be permitted.

Due to the coupling between the first lift guide track 110a and the (vertical) first guide profile 112a, the first lift guide track 110a can follow the longitudinal extension of the first guide profile 112a. Equally, due to the coupling between the second lift guide track 110a and the (vertical) second guide profile 112b, the second lift guide track 110b can follow the longitudinal extension of the second guide profile 112b.

As can also be seen in FIGS. 11 and 12, it proves advantageous if the first lift guide track 110a has a running surface 123a and a positioning opening 124 arranged in a recessed manner in the running surface 123a. The positioning opening 124 is arranged in an end region of the first lift guide track 110a facing away from the rack aisle 3, in which one of the running wheels 16 arranged on a first vehicle side of the transport vehicle 5 is situated with a partial section when the transport vehicle 5 is positioned on the receiving device 61. The second lift guide track 110b has a running surface 123b and slide linings 125 arranged thereon at a mutual distance, so that the running wheels 16 arranged on a second vehicle side of the transport vehicle 5 rest on the slide linings 125 when the transport vehicle 5 is positioned on the receiving device 61.

FIGS. 5, 11, and 14 also show a first positioning system cooperating with the lifting motor 89 of the lift drive in order to position one of the lift guide tracks 4a, 4b (vertically) with respect to one of the first and second rack guide tracks 4a, 4b on a driving plane E2. In the exemplary embodiment shown, the first lift guide track 4a is positioned (vertically) with respect to one of the first rack guide tracks 4a on a driving plane E2.

The first positioning system may comprise a "rough positioning system" and a "fine positioning system".

The "rough positioning system" may be formed by an optical laser measuring system 131 (optical laser distance measuring) schematically depicted only in FIG. 5 cooperating with the lifting motor 89, wherein the lift frame 60 is positioned into a reference position by an interaction between the lifting motor 89 and the optical laser measuring system 131. The laser sensor of the optical laser measuring system 131 is preferably mounted on the lift frame 60.

However, such a height positioning may still be insufficiently precise, for example if a change in height of the rack guide tracks 4a, 4b is to be expected during operation due to placing the storage racks 2a, 2b. In this case, it is advantageous if the "fine positioning system" is additionally provided.

The "fine positioning system" may comprise a first forked light barrier 132a, which is mounted on the lift guide track 110a, and a position marker, which is assigned to the rack guide track 4a. The position marker is, for example, a referencing opening 133a. The referencing opening 133a is provided, for example, on an angled sheet shown in FIG. 11. Alternatively, the referencing opening 133a may be provided on the rack guide track 4a. It should be pointed out that for the sake of clarity, the position marker is shown only in one driving plane E2 in FIG. 11. Generally, each rack guide track 4a (thus each driving plane E2) is assigned one position marker.

The first forked light barrier 132a may comprise a lower light beam (laser light) and an upper light beam (laser light), by which a working area is defined. If the referencing opening 133a is located in the working area of the first forked light barrier, thus the lower light beam and the upper light beam falling within the referencing opening 133a, the actual position corresponds to a reference position. If the actual position and the reference position match, the lift guide track 110a is positioned exactly with respect to the rack guide track 4a. If one of the lower and upper light beams is situated outside the referencing opening 133a in the angled sheet, one of the light beams between the transmitter and receiver is interrupted and the lifting motor 89 is controlled and the lift frame 60 is adjusted until the lower light beam and the upper light beam are within the referencing opening 133a again.

If the lower light beam and upper light beam are within the referencing opening 133a after the post-positioning of the lift frame 60/the receiving device 61, the actual position corresponds to a corrected reference position. The corrected reference position is saved by the controller, so that a repeating height position on this driving plane E2 is defined by the corrected reference position. Thus, the positioning process of the lift guide track 110a relative to the rack guide track 4a can be accelerated as the renewed determination of a corrected reference position only becomes necessary again when the actual position deviates from the corrected reference position.

The described first positioning system is one of many possibilities of how height positioning of the first lift guide track 110a relative to the first rack guide track 4a may take place. "Fine positioning systems", which comprise a camera and an image processing program, or a barcode and a barcode reader, are also known from the prior art. In this case, the first positioning system may also comprise only the "fine positioning system".

As can be seen better in FIGS. 10a, 10b, and 10d, a stop device may be provided on the rack aisle end adjacent to the transport vehicle lifting device 6 and in each driving plane E2, which stop device comprises end stop buffers 150a. 150b, each movable between a stop position (FIG. 10a)

moved into the travel path of the transport vehicle 5 and a release position (FIG. 10*b*, FIG. 10*d*) moved out of the travel path of the transport vehicle 5. Each end stop buffer 150*a*, 150*b* is arranged on a pivotable flap, the pivot axis of which extends in parallel with the rack aisle 3.

It should be pointed out that for the sake of clarity, the end stop buffer 150*a*, 150*b* is shown only in one of the driving planes E2 in FIG. 1*b*. Generally, the end stop buffers 150*a*, 150*b* are arranged in each driving plane E2.

Figure 13:
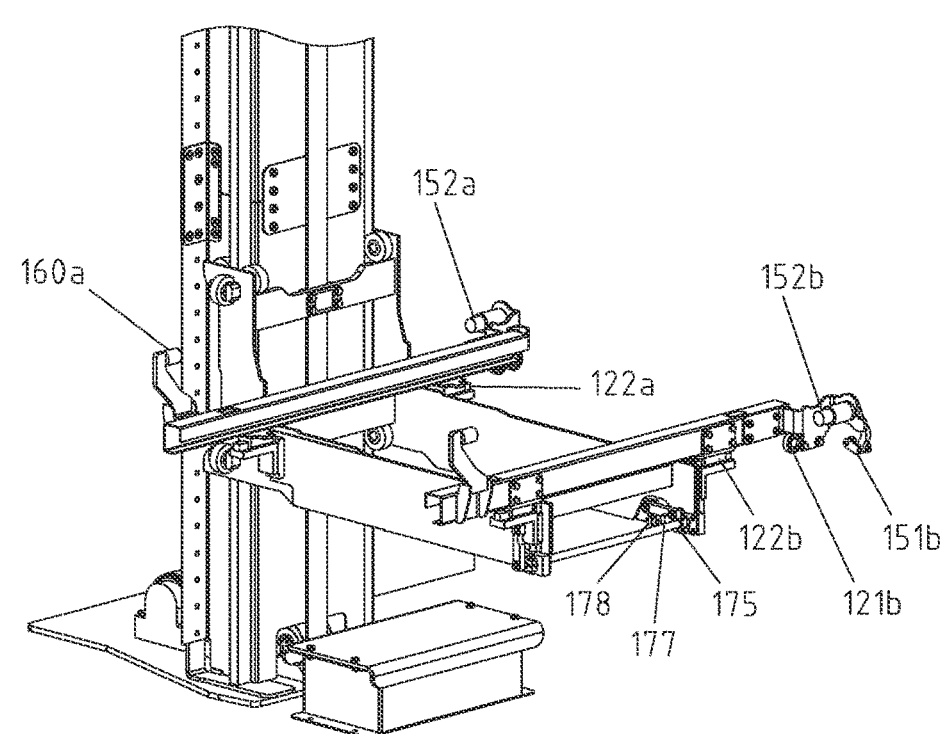
FIG. 13 a detailed view onto the lift frame and the receiving device of the transport vehicle lifting device and with a representation of the end stop buffers, which are moved into a release position.

The lift frame 60 is provided with an actuation device on a side adjacent to the rack aisle 3, which actuation device comprises a first actuating element 151*a* and a second actuating element 151*b*, as it is depicted in FIGS. 12 and 13.

The first actuating element 151*a* is assigned to a first end stop buffer 150*a* and has a first pivot lever, the pivot axis of which extends in parallel with the rack aisle 3. The first end stop buffer 150*a* may be moved by the first actuating element 151*a* out of the stop position moved into the travel path of the transport vehicle 5 into the release position moved out of the travel path of the transport vehicle 5. Usefully, the first actuating element 151*a* is coupled to a first drive motor 152*a*. It may also prove advantageous if the first actuating element 151*a* is mounted on the first lift guide track 110*a*.

The second actuating element 151*b* is assigned to a first end stop buffer 150*b* and has a second pivot lever, the pivot axis of which extends in parallel with the rack aisle 3. The second end stop buffer 150*b* may be moved by the second actuating element 151*b* out of the stop position moved into the travel path of the transport vehicle 5 into the release position moved out of the travel path of the transport vehicle 5. Usefully, the second actuating element 151*b* is coupled to a second drive motor 152*b*. It may also prove advantageous if the second actuating element 151*b* is mounted on the second lift guide track 110*b*.

As depicted in FIGS. 12 and 13, the lift frame 60 may be provided with a first end stop buffer 160*a* and second end stop buffer 160*b* on a side facing away from the rack aisle 3.

The first end stop buffer 160*a* is assigned to the first lift guide track 110*a* and is movable between a stop position (FIG. 12) moved into the travel path of the transport vehicle 5 and a release position (FIG. 13) moved out of the travel path of the transport vehicle 5. The first end stop buffer 160*a* may have a first pivot lever, the pivot axis of which extends in parallel to the rack aisle 3. It may prove useful if the first end stop buffer 160*a* is mounted on the first lift guide track 110*a*.

The second end stop buffer 160*b* is assigned to the second lift guide track 110*b* and is movable between a stop position (FIG. 12) moved into the travel path of the transport vehicle 5 and a release position (FIG. 13) moved out of the travel path of the transport vehicle 5. The second first end stop buffer 160*b* may have a second pivot lever, the pivot axis of which extends in parallel to the rack aisle 3. It may prove advantageous if the second end stop buffer 160*b* is mounted on the second lift guide track 110*b*.

A particularly advantageous design of the transport vehicle lifting device 6 is described with the aid of FIGS. 5, 11, and 12.

According to this embodiment, it is provided that one of the lift guide tracks 110*a*, 110*b* is mounted on the lift frame 60 so as to be adjustable in a direction perpendicular to the driving plane E2 by an adjusting device 170.

The adjusting device 170 comprises an actuating motor 171 cooperating with a second positioning system, in order to position the mentioned lift guide track 110*a*, 110*b* with respect to one of the rack guide tracks 4*a*, 4*b* of one of the driving planes E2. The actuating motor 171 is for example a servomotor with a rotary encoder, for example an incremental encoder.

The mentioned lift guide track 110*b* can be adjusted, particularly smoothly, between a lower relative position (see dotdashed plane Y1 in FIG. 12) and an upper relative position (see dotdashed plane Y2 in FIG. 12).

In the shown exemplary embodiment, the second lift guide track 110*b* is mounted on the lift frame 60 so as to be adjustable in a direction perpendicular to the driving plane E2 by the adjusting device 170, and the second lift guide track 110*b* is positioned with respect to one of the second rack guide tracks 4*b* of one of the driving planes E2.

One of the lift guide tracks 110*a*, 110*b* is mounted on the lift frame 60 so as to be movable in a perpendicular direction to the driving plane E2 by a guide device (z-guide device). In the shown exemplary embodiment, the second lift guide track 110*b* is mounted on the lift frame 60 so as to be movable in a perpendicular direction to the driving plane E2 by the guide device (z-guide device).

As can be seen, in addition to the "height positioning" of the first lift guide track 110*a* relative to one of the first rack guide tracks 4*a*, the second lift guide track 110*b* can also be moved relative to one of the second rack guide tracks 4*b* in a perpendicular direction to the driving plane E2, independently of the first lift guide track 110*a*.

According to the embodiment shown, the guide device (z-guide device) comprises linear guides 172 extending in a perpendicular direction to the driving plane E2. The linear guides 172 each comprise a guide track and a guide carriage mounted thereon. The guide track is preferably mounted on the lift frame 60, and the lift guide track 110*b* is mounted on the guide carriage.

If the second lift guide track 110*b* can also be moved relative to the second rack guide tracks 4*b* in a direction parallel to the rack aisle 3 by the second coupling device 110*b*, it may prove advantageous if the second lift guide tracks 110*b* are mounted on the z-guide device via the x-guide device.

In the shown exemplary embodiment, the guide track of the x-guide device is fastened, in particular screwed, to the guide carriage of the z-guide device by a mounting bracket 173.

As can be seen from a combination of FIGS. 11 and 12, the second positioning system may comprise a second forked light barrier 132*b*, which is mounted on the lift guide track 110*b*, and comprise a position marker, which is assigned to the rack guide track 4*b*. The position marker is, for example, a referencing opening 133*b*. The referencing opening 133*b* is provided, for example, on an angled sheet shown in FIG. 11. Alternatively, the referencing opening 133*b* may be provided on the rack guide track 4*b*.

The second forked light barrier 132*b* may comprise a lower light beam (laser light) and an upper light beam (laser light), by which a working area is defined. If the referencing opening 133*b* is located in the working area of the second forked light barrier, thus the lower light beam and the upper light beam falling within the referencing opening 133*b*, the actual position corresponds to a reference position. If the actual position and the reference position match, the lift guide track 110*b* is positioned exactly with respect to the rack guide track 4*b*. If one of the lower and upper light beams is situated outside the referencing opening 133*b* in the angled sheet, one of the light beams between the transmitter and receiver is interrupted and the actuating motor 171 is controlled and the lift guide track 110*b* is adjusted until the lower light beam and the upper light beam are within the referencing opening 133*b* again.

If the lower light beam and upper light beam are within the referencing opening 133*a* after the post-positioning of the second lift guide track 110*b*, the actual position corresponds to a corrected reference position. The corrected reference position is saved by the controller, so that a repeating height position on this driving plane E2 is defined by the corrected reference position. Thus, the positioning process of the lift guide track 110*b* relative to the rack guide track 4*b* can be accelerated as the renewed determination of a corrected reference position only becomes necessary again when the actual position deviates from the corrected reference position.

It proves advantageous if the positioning process of the second lift guide track 110*b* takes place after the positioning process of the first lift guide track 110*a*.

The described second positioning system is one of many possibilities of how height positioning of the second lift guide track 110*b* relative to the rack guide track 4*b* may take place. Positioning systems, which comprise a camera and an image processing program, or a barcode and a barcode reader, are also known from the prior art.

From the combination of FIGS. 11, 12, and 13, the adjusting device 170 can be gathered, as well. According to the embodiment shown, the adjusting device 170 comprises the actuating motor 171 mounted on the lift frame 60, a rotation axle 174 rotatably mounted on the lift frame 60, a first actuating lever 175 connected thereto in a torque-proof manner and a second actuating lever 176 connected thereto in a torque-proof manner. The first actuating lever 175 is coupled to the adjusting device 170 via a third actuating lever 177 and fourth actuating lever 178. The second actuating levers 176 are each coupled to the z-linear guides, in particular to the carriage and the mounting brackets 173, via a fifth actuating lever 179.

The described adjusting device 170 is one of many possibilities of how height positioning of the second lift guide track 110*b* relative to the second rack guide track 4*b* may take place. For example, electrically actuated linear guides may be used, which simultaneously form the z-guide devices. In this case, the x-guide devices are possibly each mounted on the carriage of the linear drives by the mounting brackets 173. The adjusting device 170 thus only comprises linear drives and z-guide devices separate from the linear drives may be dispensed with.

It may also prove advantageous if the corrected reference position for the first lift guide track 110*a* and/or the corrected reference position for the second lift guide tracks 110*b* is/are predetermined by the controller such that a weight force (transport vehicle unloaded or transport vehicle loaded) is taken into account. The controller is configured to calculate a height compensation factor based on the weight force. The corrected reference position for the first lift guide tracks 110*a* and/or corrected reference position for the second lift guide tracks 110*b* is/are applied with the height compensation factor. Generally, as a rule, the corrected reference position will be slightly above the driving plane E2. As soon as the transport vehicle 5 drives onto the lift guide tracks 110*a*, 110*b*, the first rack guide track 4*a* and the first lift guide track 110*a* as well as the second rack guide track 4*b* and the second lift guide track 110*b* are positioned exactly relative to one another in a vertical direction in the corresponding driving plane E2. The transport vehicle 5 driving over onto the receiving device 61 may take place in a highly dynamic and particularly gentle manner.

Figure 15:
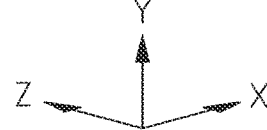
FIG. 15 a transport vehicle lifting device of the rack storage system in a second embodiment without an additional adjusting device for a second lift guide track.

Finally, FIG. 15 shows a transport vehicle lifting device 6', according to which, in contrast to the embodiment described above, the first lifting device 110*a* is coupled to the first guide profile 112*a* by the first coupling device 110*a*, and the second lift guide track 110*b* is coupled to the second guide profile 112*b* by the second coupling device 111*b*, and these are movable only in a direction parallel to the rack guide tracks 4*a*, 4*b*. An adjustment of the second lift guide track 110*b* in a direction perpendicular to the driving plane E2 is not provided. Such an embodiment may be the subject matter of an independent inventive solution.

Finally, it should also be noted that the scope of protection is determined by the claims. Nevertheless, the description and drawings are to be used for construing the claims. Individual features or feature combinations from the different exemplary embodiments shown and described may represent independent inventive solutions.

In particular, it should also be noted that the devices shown may in reality comprise more or fewer components than those shown. In some cases, the shown devices and/or their components may not be depicted to scale and/or be enlarged and/or reduced in size.

LIST OF REFERENCE NUMBERS

E1 Storage plane
E2 Driving plane
E3 Maintenance plane
FE Guide plane
2*a*, 2*b* Storage rack
3 Rack aisle
4*a*, 4*b* Rack guide track
5 Transport vehicle
6, 6' Transport vehicle lifting device
7 Storage place
8 Unit load
9 First guide
Second guide
11*a*, 11*b* Front rack upright
12*a*, 12*b* Rear rack upright
13*a*, 13*b* Rack shelf
15 Base frame
16 Running wheel
17 Guide wheel
19 Storage and retrieval device
20 Unit load manipulation unit
21*a*, 21*b* Unit load transport device (storage, retrieval)
22*a*, 22*b* Buffer device (storage, retrieval)
23 Vertical mast
24 Lift guide
25*a*, 25*b* Drive station
26*a*, 26*b* Traction drive
27*a*, 27*b* Lift frame
28*a*, 28*b* Transport device
29*a*, 29*b* Provisioning device
30 Deformation device
31*a*, 31*b* Conveying system
32*a*, 32*b* Mounting crossbeam
33 Walkway
46*a* Front rack upright
47*a* Rear rack upright
48*a* Front mounting crossbeam
49*a* Rear mounting crossbeam
50*a* First frame profile
51*a* Second frame profile
52 Walkway
53 Ladder 59 Guide frame
60 Lift frame
61 Receiving device
62 Mounting section
63 Fastening element
64 Connecting means
65 Distance plate
70 Guide frame segment
71a, 71b Connecting plate
72 Profile base
73 Profile limb
74 Mounting limb
75 Connecting strut
81a, 81b Guide rail
82 Connecting means
83 Butt joint
89 Lifting motor
90 Drive wheel
91a, 91b Lower deflection wheel/upper deflection wheel
92 Guide wheel
93 Traction means
94 Clamp
100 Deformation device
101 Force distribution plate
102 Honeycomb body
103 Mounting plate
104a, 104b Guide wheel
110a, 110b Lift guide track
111a, 111b Coupling device
112a, 112b Guide profile
113a, 113b Connecting means
114a, 114b Passage opening
115a, 115b End edge
116a, 116b Passage opening
117a, 117b Guideway
120a, 120b Holder
121a, 121b Guide wheel
122a. 122b Linear guide
123a, 123b Running surface
124 Positioning opening
125 Slide lining
131 Laser measuring system
132a, 132b Forked light barrier
133a, 133b Referencing opening
150a, 150b End stop buffer
151a, 151b Actuating element
152a, 152b Drive motor
160a, 160b End stop buffer
170 Adjusting device
171 Actuating motor
172 Linear guide
173 Mounting bracket
174 Rotation axle
175 First actuating lever
176 Second actuating lever
177 Third actuating lever
178 Fourth actuating lever
179 Fifth actuating lever

The invention claimed is:

1. A rack storage system comprising
a first storage rack with storage places for unit loads, wherein the storage places are arranged next to one another in storage planes located on top of each other,
a second storage rack with storage places for unit loads, wherein the storage places are arranged next to one another in storage planes located on top of each other, a rack aisle between the first storage rack and the second storage rack,
rack guide tracks attached to the first storage rack and second storage rack and arranged in each case in pairs in driving planes located on top of each other,
at least one automated transport vehicle movable in the rack aisle along the rack guide tracks in order to store the unit loads in the storage places and to retrieve the unit loads from the storage places,
a transport vehicle lifting device with a vertically extending guide frame and a lift frame mounted on the guide frame so as to be adjustable by a lift drive, wherein a receiving device is arranged on the lift frame, comprises lift guide tracks extending in parallel with the rack guide tracks and positionable relative to the rack guide tracks, and transports the transport vehicle,
a first guide profile extending essentially parallel to the guide frame and connected to the rack guide tracks on the first storage rack, and
a second guide profile extending essentially parallel to the guide frame and is connected to the rack guide tracks on the second storage rack,
a first lift guide track of the lift guide tracks mounted on the lift frame so as to be movable in a direction parallel to the rack guide tracks by a first guide device and is coupled to the first guide profile by a first coupling device, and
a second lift guide track of the lift guide tracks mounted on the lift frame so as to be movable in a direction parallel to the rack guide tracks by a second guide device and is coupled to the second guide profile by a second coupling device.

2. The rack storage system according to claim 1, wherein the first coupling device comprises a holder and guide wheels mounted thereon so as to be rotatable about horizontal axes, wherein the guide wheels rest in a rollable manner on the first guide profile on guideways facing away from one another, and the second coupling device comprises a holder and guide wheels mounted thereon so as to be rotatable about horizontal axes, wherein the guide wheels rest in a rollable manner on the second guide profile on guideways facing away from one another.

3. The rack storage system according to claim 1, wherein the guide frame comprises a guide assembly and the lift drive comprises a lifting motor and a traction drive, wherein the lift frame is coupled to the traction drive and is mounted on the guide assembly by guide rollers.

4. The rack storage system according to claim 1, wherein the guide frame comprises a profile base, profile limbs projecting from the profile base, and mounting limbs angled on the free ends of the profile limbs, wherein the guide frame is fastened to the first storage rack or second storage rack by the mounting limbs.

5. The rack storage system according to claim 1, wherein the first rack guide track forms a mounting section in an end adjacent to the transport vehicle lifting device, wherein the mounting section is provided with a prefabricated passage opening arranged at a clearance from the end edge of the first rack guide track, the first guide profile forms a row of prefabricated passage openings, the first rack guide track and the first guide profile are connected to one another by at least one connecting means which penetrates the passage openings of the first rack guide track and the first guide profile, the second rack guide track forms a mounting section in an end adjacent to the transport vehicle lifting device, wherein the mounting section is provided with a pre-fabricated passage opening arranged at a clearance from the end edge of the second rack guide track, the second guide profile forms a row of prefabricated passage openings, and the second rack guide track and the second guide profile are connected to one another by at least one connecting means which penetrates the passage openings of the second rack guide track and the second guide profile.

6. The rack storage system according to claim 1, wherein the lift drive comprises a lifting motor cooperating with a first positioning system in order to position the lift guide tracks with respect to the rack guide tracks on a driving plane, one of the lift guide tracks is mounted on the lift frame so as to be adjustable in a direction perpendicular to the driving plane by an adjusting device, and the adjusting device comprises an actuating motor cooperating with a second positioning system in order to position the one of the lift guide tracks with respect to one of the rack guide tracks of one of the driving planes.

7. The rack storage system according to claim 1, wherein the transport vehicle lifting device comprises an energy-absorbing deformation device stationarily arranged below the lift frame.

8. The rack storage system according to claim 7, wherein the energy-absorbing deformation device comprises a force distribution plate with an impact surface for the lift frame, a honeycomb body that is plastically deformable by application of force, below the force distribution plate, wherein the honeycomb body at least partially absorbs the impact energy occurring upon collision of the lift frame with the force distribution plate, and a mounting plate below the honeycomb body for mounting the deformation device.

9. The rack storage system according to claim 8, wherein cavities of the honeycomb body extend in the vertical direction.

10. The rack storage system according to claim 1, wherein a stop device is provided on the rack aisle end adjacent to the transport vehicle lifting device and in each driving plane, wherein the stop device comprises end stop buffers each movable between a stop position moved into the travel path of the transport vehicle and a release position moved out of the travel path of the transport vehicle.

11. The rack storage system according to claim 10, wherein each end stop buffer is arranged on a pivotable flap, wherein a pivot axis of the pivotable flap extends in parallel with the rack aisle.

12. The rack storage system according to claim 10, wherein at least one of the lift frame and the receiving device is provided with an actuation device on a side adjacent to the rack aisle, wherein the actuation device comprises a first actuating element and a second actuating element, wherein the first actuating element is assigned to a first end stop buffer of the end stop buffers and the first end stop buffer is movable out of the stop position into the release position by the first actuating element, and wherein the second actuating element is assigned to a second end stop buffer of the end stop buffers and the second end stop buffer is movable out of the stop position into the release position by the second actuating element.

13. The rack storage system according to claim 12, wherein the first actuating element has a first pivot lever, wherein a pivot axis of the first pivot lever extends in parallel with the rack aisle, and the second actuating element has a second pivot lever, wherein a pivot axis of the second pivot lever extends in parallel with the rack aisle.

14. The rack storage system according to claim 12, wherein the first actuating element is coupled to a first drive motor, and the second actuating element is coupled to a second drive motor.

15. The rack storage system according to claim 12, wherein the first actuating element is mounted on the first lift guide track, and the second actuating element is mounted on the second lift guide track.

16. The rack storage system according to claim 1, wherein at least one of the lift frame and the receiving device is provided with a first end stop buffer and second end stop buffer on a side facing away from the rack aisle, wherein the first end stop buffer is assigned to the first lift guide track and is movable between a stop position moved into the travel path of the transport vehicle and a release position moved out of the travel path of the transport vehicle, and wherein the second end stop buffer is assigned to the second lift guide track and is movable between a stop position moved into the travel path of the transport vehicle and a release position moved out of the travel path of the transport vehicle.

17. The rack storage system according to claim 16, wherein the first end stop buffer is mounted on the first lift guide track, and the second end stop buffer is mounted on the second lift guide track.

18. The rack storage system according to claim 16, wherein the first end stop buffer has a first pivot lever, wherein a pivot axis of the first pivot lever extends in parallel with the rack aisle, and the second first end stop buffer has a second pivot lever, wherein a pivot axis of the second pivot lever extends in parallel with the rack aisle.

19. The rack storage system according to claim 1, wherein the first lift guide track has a running surface and a positioning opening arranged in the running surface in a recessed manner, wherein the positioning opening is arranged in an end region facing away from the rack aisle and one of the running wheels arranged on a first vehicle side of the transport vehicle has a circumferential portion situated in the positioning opening when the transport vehicle is positioned on the receiving device.

20. The rack storage system according to claim 19, wherein the second lift guide track has a running surface and slide linings arranged on the running surface at a mutual distance from each other as the running wheels arranged on a second vehicle side of the transport vehicle, wherein the running wheels arranged on the second vehicle side of the transport vehicle rest on the slide linings when the transport vehicle is positioned on the receiving device.

21. The rack storage system according to claim 1, comprising a conveying system for transporting unit loads, and a unit load manipulation unit, wherein the conveying system for transporting unit loads adjoins the unit load manipulation unit, and wherein the unit load manipulation unit comprises a first unit load transport device and a first buffer device for storage of unit loads and a second unit load transport device and a second buffer device for retrieving unit loads, wherein the first buffer device has provisioning devices arranged in provisioning planes located on top of each other, and the second buffer device has provisioning devices arranged in provisioning planes located on top of each other, wherein the first unit load transport device connects the conveying system for transporting unit loads and the provisioning devices of the first buffer device, wherein the second unit load transport device connects the conveying system for transporting unit loads and the provisioning devices of the second buffer device, and wherein the at least one automated transport vehicle is movable in the rack aisle along the rack guide tracks in front of the storage places, the first buffer device and second buffer device and transports the unit loads between the first buffer device and the storage places or between the storage places and the second buffer device.

22. A rack storage system comprising a first storage rack with storage places for unit loads, wherein the storage places are arranged next to one another in storage planes located on top of each other, a second storage rack with storage places for unit loads, wherein the storage places are arranged next to one another in storage planes located on top of each other, a rack aisle between the first storage rack and the second storage rack, rack guide tracks attached to the first storage rack and second storage rack and are arranged in each case in pairs in driving planes located on top of each other, at least one automated transport vehicle movable in the rack aisle along the rack guide tracks in order to store the unit loads in the storage places and to retrieve the unit loads from the storage places, a transport vehicle lifting device with a vertically extending guide frame and a lift frame mounted on the guide frame so as to be adjustable by a lift drive, wherein a receiving device is arranged on the lift frame, comprises lift guide tracks extending in parallel with the rack guide tracks and positionable relative to the rack guide tracks, and transports the transport vehicle between the driving planes, wherein the lift drive comprises a lifting motor cooperating with a first positioning system in order to position the lift guide tracks with respect to the rack guide tracks on a driving plane, wherein one of the lift guide tracks is mounted on the lift frame so as to be adjustable in a direction perpendicular to the driving plane by an adjusting device, and wherein the adjusting device comprises an actuating moto cooperating with a second positioning systemin order to position the one of the lift guide tracks with respect to one of the rack guide tracks of one of the driving planes.

23. The rack storage system according to claim 22, further comprising a first guide profile extending essentially parallel to the guide frame and connected to the rack guide tracks on the first storage rack, a second guide profile extending essentially parallel to the guide frame and connected to the rack guide tracks on the second storage rack, a first lift guide track of the lift guide tracks mounted on the lift frame so as to be movable in a direction parallel to the rack guide tracks by a first guide device and coupled to the first guide profile by a first coupling device, and a second lift guide track of the lift guide tracks mounted on the lift frame so as to be movable in a direction parallel to the rack guide tracks by a second guide device and coupled to the second guide profile by a second coupling device.

24. The rack storage system according to claim 23, wherein the first coupling device comprises a holder and guide wheels mounted thereon so as to be rotatable about horizontal axes, wherein the guide wheels rest in a rollable manner on the first guide profile on guideways facing away from one another, and the second coupling device comprises a holder and guide wheels mounted thereon so as to be rotatable about horizontal axes, wherein the guide wheels rest in a rollable manner on the second guide profile on guideways facing away from one another.

25. The rack storage system according to claim 22, wherein a stop device is provided on the rack aisle end adjacent to the transport vehicle lifting device and in each driving plane, wherein the stop device comprises end stop buffers each movable between a stop position moved into the travel path of the transport vehicle and a release position moved out of the travel path of the transport vehicle.

26. The rack storage system according to claim 25, wherein at least one of the lift frame and the receiving device is provided with an actuation device on a side adjacent to the rack aisle, wherein the actuation device comprises a first actuating element and a second actuating element, wherein the first actuating element is assigned to a first end stop buffer of the end stop buffers and the first end stop buffer is movable out of the stop position into the release position by the first actuating element, and wherein the second actuating element is assigned to a second end stop buffer of the end stop buffers and the second end stop buffer is movable out of the stop position into the release position by the second actuating element.

27. The rack storage system according to claim 26, wherein the first actuating element is mounted on the first lift guide track, and the second actuating element is mounted on the second lift guide track.

* * * * *